US012722532B2

(12) United States Patent
Carroll et al.

(10) Patent No.: US 12,722,532 B2
(45) Date of Patent: Sep. 1, 2026

(54) CONSTANT CENTER LOUNGE SEAT

(71) Applicant: Camaco, LLC, Farmington Hills, MI (US)

(72) Inventors: Jeffrey Carroll, West Bloomfield, MI (US); David Williams, South Lyon, MI (US); Joseph Parent, Canton, MI (US); Amol Mundhe, Osmanabad (IN)

(73) Assignee: Camaco, LLC

( * ) Notice: Subject to any disclaimer, the term of this patent is extended or adjusted under 35 U.S.C. 154(b) by 141 days.

(21) Appl. No.: 18/627,005

(22) Filed: Apr. 4, 2024

(65) Prior Publication Data

US 2024/0336167 A1 Oct. 10, 2024

Related U.S. Application Data

(60) Provisional application No. 63/457,538, filed on Apr. 6, 2023.

(51) Int. Cl.

| | |
|---|---|
| ***B60N 2/02*** | (2006.01) |
| ***B60N 2/06*** | (2006.01) |
| ***B60N 2/16*** | (2006.01) |
| ***B60N 2/20*** | (2006.01) |
| ***B60N 2/90*** | (2018.01) |

(52) U.S. Cl.

CPC ........... *B60N 2/02246* (2023.08); *B60N 2/06* (2013.01); *B60N 2/165* (2013.01); *B60N 2/20* (2013.01); *B60N 2/995* (2018.02)

(58) Field of Classification Search

CPC ...... B60N 2/02246; B60N 2/06; B60N 2/165; B60N 2/20; B60N 2/995; B60N 2/1615; B60N 2/1803; B60N 2/1835; B60N 2/1842; B60N 2/181; B60N 2/1864; B64D 11/0643

See application file for complete search history.

(56) References Cited

U.S. PATENT DOCUMENTS

| | | | | | |
|---|---|---|---|---|---|
| 2,567,612 | A * | 9/1951 | Mcgehee | A47C 3/0255 | 248/370 |
| 3,075,736 | A * | 1/1963 | Freedman | B60N 2/06 | 248/419 |
| 4,408,802 | A * | 10/1983 | Adomeit | B60N 2/02 | 297/445.1 |
| 4,884,843 | A * | 12/1989 | DeRees | B60N 2/045 | 297/331 |
| 4,890,810 | A * | 1/1990 | Sakamoto | B60N 2/502 | 248/608 |

(Continued)

*Primary Examiner* — Medhat Badawi

(74) *Attorney, Agent, or Firm* — Foley & Lardner LLP

(57) ABSTRACT

A lounge seat for a vehicle defines a seat reference point. The lounge seat includes a seat frame assembly, a back frame assembly pivotably coupled to the seat frame assembly, a track assembly coupled to the seat frame assembly and configured to facilitate translating the seat frame assembly in a X direction, and a plurality of motors configured to cause movement of the seat frame assembly, the back frame assembly, and the track assembly to adjust the lounge seat between a full upright orientation associated with an initial X position of the seat reference point along the X direction and a full down orientation associated with a final X position of the seating reference point along the X direction. The initial X position and the final X position are substantially the same.

20 Claims, 16 Drawing Sheets

(56) References Cited

U.S. PATENT DOCUMENTS 4,993,678 A * 2/1991 Easter .................. B60N 2/1675 248/371
5,014,960 A * 5/1991 Kimura .................. B60N 2/544 248/419
5,154,402 A * 10/1992 Hill ...................... B60N 2/1615 74/528
5,318,341 A * 6/1994 Griswold ................. B60N 2/66 297/483
5,385,382 A * 1/1995 Single ...................... A47C 7/74 297/180.13
5,403,068 A * 4/1995 Fatchett ............... B60N 2/2352 297/367 R
5,586,740 A * 12/1996 Borlinghaus ...... B60N 2/02246 248/419
5,697,674 A * 12/1997 Aufrere ................ B60N 2/1885 297/452.52
5,772,278 A * 6/1998 Kowalski ............. A47C 1/0355 297/85 L
6,836,951 B2 * 1/2005 Dudash .................. B60N 2/809 29/523
7,926,876 B2 * 4/2011 Zadai ........................ B66F 3/12 297/DIG. 10
8,770,646 B2 * 7/2014 Line ..................... B60N 2/1615 297/331
9,050,914 B2 * 6/2015 Hage-Hassan ......... B60N 2/305
9,351,889 B2 * 5/2016 Mulhern ................ A61G 5/125
9,914,371 B2 * 3/2018 Fitzpatrick ............. B60N 2/045
10,369,907 B2 * 8/2019 Baba .................... B60N 2/4228
11,198,379 B2 * 12/2021 Oshima ................ B60N 2/0252
11,478,083 B1 * 10/2022 Li .......................... A47C 17/04
11,564,496 B1 * 1/2023 Li ........................ A47C 1/0355
11,628,748 B2 * 4/2023 Andrews ................ B60N 2/065 296/190.1
11,724,624 B2 * 8/2023 Eisenberg .............. B60N 2/065 410/129
12,472,849 B2 * 11/2025 Legh ...................... B60N 2/838
12,472,855 B2 * 11/2025 Yoon ........................ B60N 2/80
12,472,857 B2 * 11/2025 Kim ....................... B60N 2/995
2002/0014795 A1 * 2/2002 Williams ............... A47C 1/023 297/337
2005/0046129 A1 * 3/2005 Antonishak ............ A61G 5/043 280/47.4
2006/0087166 A1 * 4/2006 Trippensee ........... B66F 7/0608 297/338
2007/0084648 A1 * 4/2007 DuFresne ............ A61G 5/1059 180/907
2007/0246985 A1 * 10/2007 Sahi ..................... B60N 2/1615 297/331
2008/0203790 A1 * 8/2008 Olarte ...................... A47C 1/12 297/331
2009/0189408 A1 * 7/2009 DeVoss .............. B60N 2/02246 296/65.09
2010/0072800 A1 * 3/2010 Weber .................... B60N 2/162 297/344.15
2012/0169099 A1 * 7/2012 Horiguchi .............. B60N 2/164 297/314
2013/0011335 A1 * 1/2013 Xie .................... G01N 33/5008 514/19.5
2014/0145476 A1 * 5/2014 Nagayasu ................ B60N 2/62 297/86
2015/0108805 A1 * 4/2015 Linnenbrink .......... B60N 2/686 297/344.1
2015/0274301 A1 * 10/2015 Udriste .............. B64D 11/0641 297/354.11
2015/0375640 A1 * 12/2015 Yin ........................ B60N 3/063 297/157.1
2016/0045031 A1 * 2/2016 Lawson ................. A47C 7/506 297/284.3
2016/0288669 A1 * 10/2016 Woodhouse ......... B60N 2/0021
2016/0325642 A1 * 11/2016 Fitzpatrick ......... B60N 2/02246
2017/0015423 A1 * 1/2017 Udriste .................... B60N 2/77
2017/0368966 A1 * 12/2017 Jensen ................... B60N 2/309
2018/0027968 A1 * 2/2018 Lawson ............... A47C 1/0355
2018/0103761 A1 * 4/2018 White .................. A47C 1/0352
2018/0208319 A1 * 7/2018 McCarley .......... B64D 11/0689
2019/0077283 A1 * 3/2019 Kimura .................. B60N 2/995
2020/0100593 A1 * 4/2020 He ........................... A47C 7/38
2020/0100596 A1 * 4/2020 He ......................... A47C 17/00
2022/0289086 A1 * 9/2022 Line ..................... B60N 2/3013
2023/0068014 A1 * 3/2023 Sun .................... A47C 1/03211
2023/0107030 A1 * 4/2023 Son ........................ B60N 2/146 297/341
2023/0200536 A1 * 6/2023 Beech .................. A47C 31/008 297/463.1
2023/0380597 A1 * 11/2023 Li ........................ A47C 1/0355
2024/0023713 A1 * 1/2024 Murphy ............... A47C 1/0345
2024/0122346 A1 * 4/2024 Murphy ............... A47C 1/0355
2024/0138568 A1 * 5/2024 Yang .................... A47C 1/0355
2024/0138577 A1 * 5/2024 Yang ................. A47C 1/03211
2024/0148144 A1 * 5/2024 Li ........................ A47C 1/0345
2024/0148145 A1 * 5/2024 Li ........................ A47C 1/0355
2024/0156262 A1 * 5/2024 Li ........................ A47C 1/0355
2024/0156263 A1 * 5/2024 Li ........................ A47C 1/0347
2024/0164527 A1 * 5/2024 Li ........................ A47C 7/5068
2024/0215726 A1 * 7/2024 Li ........................ A47C 1/0345
2024/0277145 A1 * 8/2024 Li ............................ A61G 5/14
2024/0298805 A1 * 9/2024 Li ........................ A47C 7/5068
2024/0335039 A1 * 10/2024 Lake .................... A47C 1/0355
2024/0335042 A1 * 10/2024 Liu ........................ A47C 1/024
2024/0336167 A1 * 10/2024 Carroll ..................... B60N 2/06
2024/0341478 A1 * 10/2024 Zhao ........................ A47C 3/03
2024/0341479 A1 * 10/2024 Murphy ............... A47C 1/0355
2024/0365979 A1 * 11/2024 Lawson ............... A47C 1/0355
2024/0374031 A1 * 11/2024 Tan ...................... A47C 1/0355
2024/0374032 A1 * 11/2024 Sun ...................... A47C 1/0355
2024/0375559 A1 * 11/2024 Moulin .............. B60N 2/02253
2024/0389751 A1 * 11/2024 Sun .................... A47C 1/03211
2024/0423369 A1 * 12/2024 Loccioni .............. A47C 1/0342
2025/0000260 A1 * 1/2025 Cai ...................... A47C 1/0355
2025/0026252 A1 * 1/2025 Kim .................... B60N 2/3093
2025/0040708 A1 * 2/2025 Lake .................... A47C 1/0355
2025/0040709 A1 * 2/2025 Lake .................... A47C 1/0355
2025/0057317 A1 * 2/2025 Zhou ...................... A47C 17/86
2025/0072612 A1 * 3/2025 Zhao .................... A47C 1/0355
2025/0082099 A1 * 3/2025 Ye ...................... A47C 1/03211
2025/0107624 A1 * 4/2025 Dick .................... A47C 1/0355
2025/0151906 A1 * 5/2025 Yang .................... A47C 1/0355
2025/0151908 A1 * 5/2025 Lei ....................... A47C 1/0242
2025/0160520 A1 * 5/2025 Cai ...................... A47C 1/0345
2025/0160521 A1 * 5/2025 Cai ...................... A47C 1/0345
2025/0261757 A1 * 8/2025 Crum ................. A47C 1/03211
2025/0280955 A1 * 9/2025 Murphy ............... A47C 15/004
2025/0295236 A1 * 9/2025 Johnson ................. A47C 1/121

* cited by examiner 46
60
70
90
130

CONSTANT CENTER LOUNGE SEAT

CROSS-REFERENCE TO RELATED APPLICATION

This application claims the benefit of and priority to U.S. Provisional Patent Application No. 63/457,538, filed Apr. 6, 2023, which is incorporated herein by reference in its entirety.

BACKGROUND

The present application relates to seat assemblies for use in vehicles. More specifically, the present application relates to seat assemblies that provide reclining functionality in a manner that keeps the seating reference point ("SgRP") substantially or nearly constant in the X Plane during and after seat articulation. The SgRP is sometimes referred to as a hip point or H-Point.

A typical vehicle (e.g., car, truck, etc.) includes a passenger cabin that includes seat assemblies for accommodating and supporting occupants. One or more of the seat assemblies (e.g., the seat assemblies in the front of the cabin, but potentially in other locations as well) may include a track assembly that secures the seat to a floor of the cabin and also allows forward/backward positioning of the seat. Additionally, the seat assemblies may facilitate repositioning the seat between a plurality of positions to enhance the comfort of the occupant. For example, the seats may include reclining features that allow the seatback to rotate between more and less reclined positions.

It would be advantageous to provide an improved seat assembly for use in vehicles.

SUMMARY

One exemplary embodiment relates to a lounge seat for a vehicle. The lounge seat includes a track assembly, a seat frame assembly having a front end and a rear end, a back frame assembly pivotably coupled to the rear end of the seat frame assembly, a plurality of front couplers coupling the front end of the seat frame assembly to the track assembly, a plurality of rear couplers coupling the rear end of the seat frame assembly to the track assembly; a height adjust motor configured to cause movement of the seat frame assembly, a recline motor configured to pivot the back frame assembly relative to the seat frame assembly, and a track motor configured to translate the seat frame assembly along the track assembly in a X direction. The height adjust motor, the recline motor, and the track motor are configured to reposition the lounge seat between a full upright orientation associated with a first seating reference point and a full down orientation associated with a second seating reference point. A difference between the first seating reference point and the second seating reference point in the X direction is less than 35 mm.

Another exemplary embodiment relates to a lounge seat for a vehicle. The lounge seat includes a track assembly, a seat frame assembly having a front end and a rear end, a back frame assembly pivotably coupled to the rear end of the seat frame assembly, a plurality of front couplers coupling the front end of the seat frame assembly to the track assembly, a plurality of rear couplers coupling the rear end of the seat frame assembly to the track assembly, a height adjust motor configured to cause movement of the seat frame assembly, a recline motor configured to pivot the back frame assembly relative to the seat frame assembly, and a track motor configured to translate the seat frame assembly along the track assembly in a X direction. As the lounge seat is reconfigured from a full upright orientation to a full down orientation, (i) the track motor is configured to cause the seat frame assembly to move along the X direction, (ii) the height adjust motor is configured to cause the front end of the seat frame assembly to raise and cause the rear end of the seat frame assembly to lower, and (iii) the recline motor is configured to cause the back frame assembly to pivot downward. The lounge seat defines a seat reference point. An X position of the lounge seat is configured to deviate less than 15 mm in the X direction from an initial X position of the seat reference point as the lounge seat is repositioned between the full upright orientation and the full down orientation. A difference between the initial X position of the seat reference point associated with the full upright orientation and a final X position of the seat reference point associated with the full down orientation in the X direction is less than 5 mm.

Another exemplary embodiment relates to a lounge seat for a vehicle. The lounge seat defines a seat reference point. The lounge seat includes a seat frame assembly, a back frame assembly pivotably coupled to the seat frame assembly, a track assembly coupled to the seat frame assembly and configured to facilitate translating the seat frame assembly in a X direction, and a plurality of motors configured to cause movement of the seat frame assembly, the back frame assembly, and the track assembly to adjust the lounge seat between a full upright orientation associated with an initial X position of the seat reference point along the X direction and a full down orientation associated with a final X position of the seating reference point along the X direction. The initial X position and the final X position are substantially the same This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a lounge seat of the present disclosure includes a seat frame assembly, a back frame assembly, a track assembly, and in some instances a leg rest assembly that facilitate adjustment of the lounge seat such that a SgRP of the lounge seat remains relatively constant in a X Plane while the SgRP is translated in a Z Plane. Front and rear directions define the X Plane. Up and down directions define the Z Plane.

Lounge seats typically include a variety of components that can interfere with adjacent interior components in a vehicle. For example, a lounge seat that is rotating or moving can interfere with interior components in a vehicle that are in front of the seat, such as a glove compartment or another seat in front of the lounge seat. Further, a lounge seat that is rotating or moving can interfere with interior components in a vehicle that are behind the seat, such as another seat or a rear windshield. Additionally, a lounge seat that is rotating or moving can interfere with interior components in a vehicle that are above the seat, such as the roof, sunroof, or hood of the car. Further still, a lounge seat that is rotating or moving can interfere with interior components in a vehicle that are below the seat, such as the floor of the car or the top portions of the rear wheels of the car (e.g., the interior arc of the wheelhouse). The lounge seat of the present disclosure facilitates seamless interaction of all of the interior components by providing a SgRP that remains nearly or substantially constant in the X Plane during and after seat adjustment, as discussed in more detail below.

While the concepts discussed herein are described in the concept of a motorized power seat assembly, they may also have utility in manually adjustable seat configurations and electromechanically adjustable seat configurations.

Figure 1:
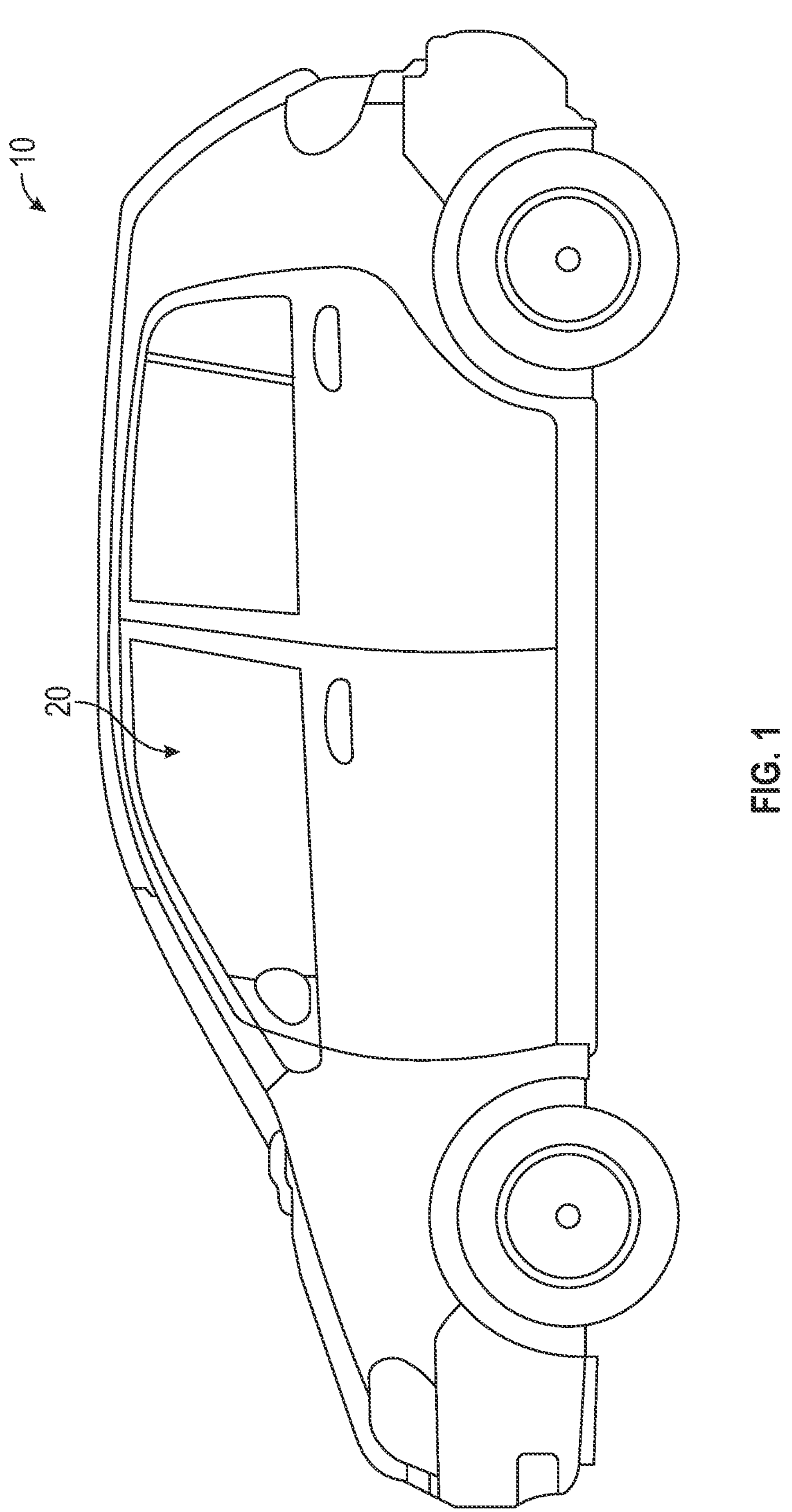
FIG. 1 is a side view of a vehicle, according to an exemplary embodiment.
Figure 2:
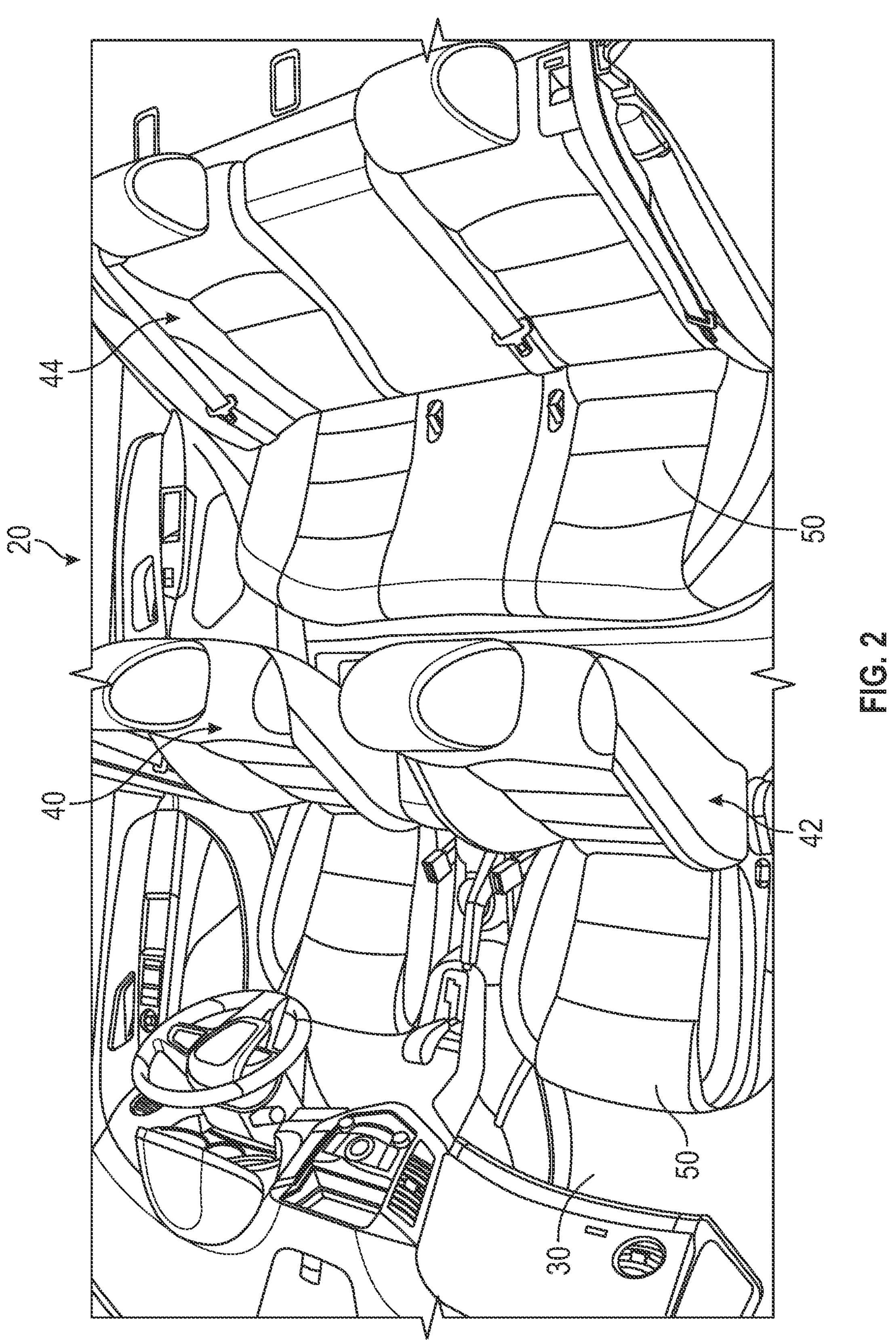
FIG. 2 is a perspective view of a cabin of the vehicle of FIG. 1 including seats, according to an exemplary embodiment.

As shown in FIGS. 1 and 2, a vehicle 10 includes an interior cabin, shown as passenger cabin 20. In one embodiment, the vehicle 10 is configured as a vehicle such as a sedan, a sport utility vehicle ("SUV"), a pickup truck, a van, or still another type of passenger vehicle. In other embodiments, the vehicle 10 is configured as another type of vehicle such as a semi-truck, a bus, a train, a tram, a subway, or the like. In still other embodiments, the vehicle 10 is configured as an off-road vehicle such as construction machinery, farming machinery, or the like. While the concepts discussed herein are described in the concept of a lounge seat in a vehicle, they may also have utility in other modes of transportation, such as a lounge seat in a boat, an airplane, a funicular, or a gondola lift.

As shown in FIG. 2, the passenger cabin 20 includes a support surface, shown as cabin floor 30, that supports one or more seating assemblies, shown as seats 40, including front seats 42 and rear seats 44. The rear seats 44 can include more than two seats. For example, the rear seats 44 can be distributed amongst two rows such that there are four rear seats 44. In some embodiments, the front seats 42 are different than the rear seats 44. In other embodiments, the front seats 42 and the rear seats 44 are the same or utilize similar components (e.g., to facilitate increased scaling for manufacturing and, therefore, a reduction in production costs). By way of example, the front seats 42 and the rear seats 44 may utilize a similar track assembly, however, the track assembly for one of the front seats 42 or the rear seats 44 may include one or more additional components (e.g., for added strength, to meet or exceed industry standards, etc.). In some embodiments, the passenger cabin 20 does not include the rear seats 44. In some embodiments, the passenger cabin 20 only includes a single front seat 42. Each of the seats 40 includes a plurality of padded components (e.g., a seat back pad or cushion, a seat bottom pad or cushion, etc.), shown as seat cushions 50.

Figure 3:
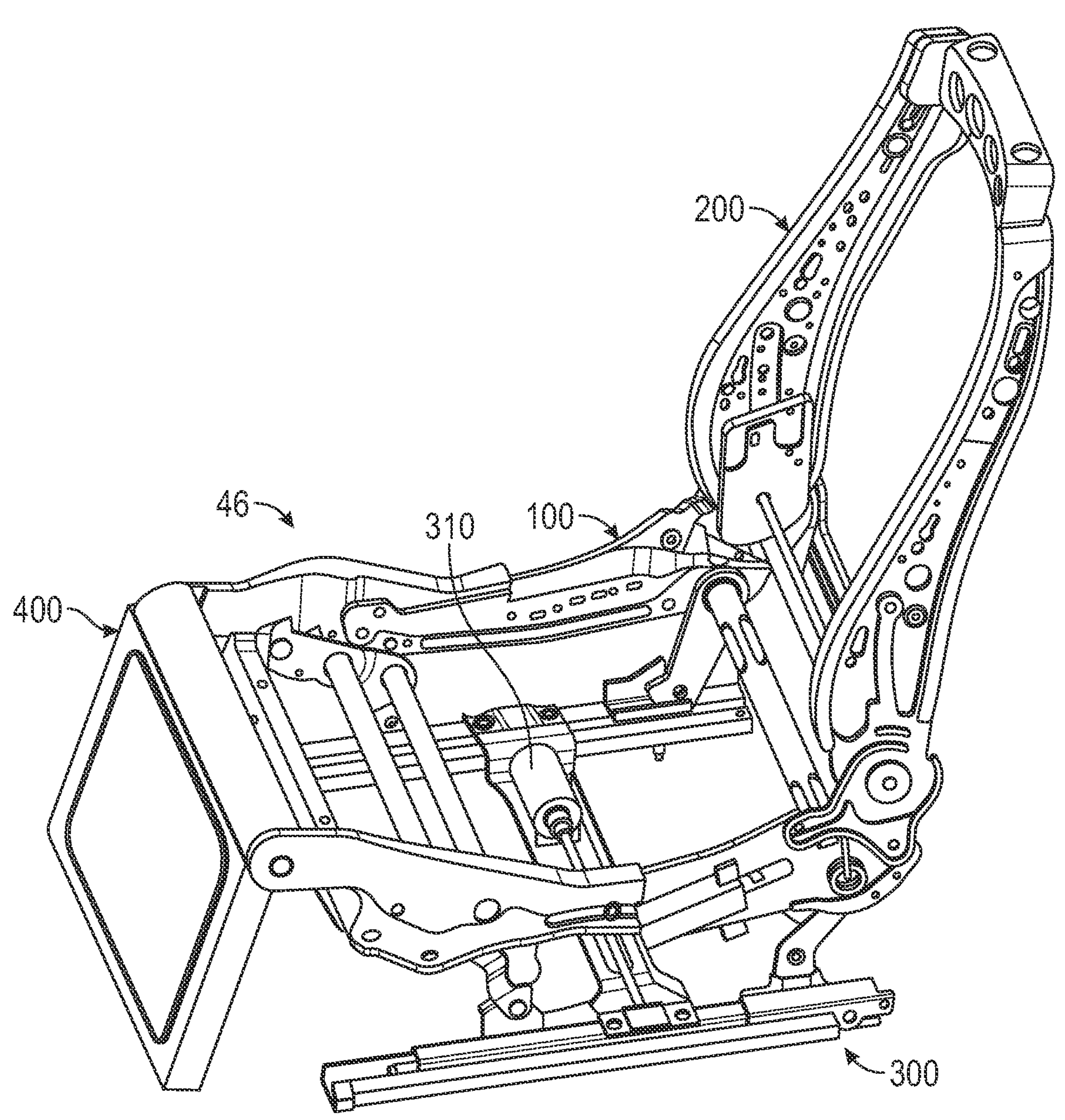
FIG. 3 is a perspective view of a frame assembly of a lounge seat, which includes a seat frame assembly, a back frame assembly, a track assembly, and in some instances a leg rest assembly, according to an exemplary embodiment.

As shown in FIG. 3, at least one of the seats 40 is configured as a lounge seat 46 that includes (i) a first frame portion, shown as seat frame assembly 100, configured to support the seat cushions 50, (ii) a second frame portion, shown as back frame assembly 200, and (iii) a third frame portion, shown as track assembly 300, configured to support and couple the seat frame assembly 100 and, thereby, the lounge seat 46 to the cabin floor 30. According to an exemplary embodiment, the track assembly 300 is adjustable (e.g., manually adjustable, electronically adjustable, electromechanically adjustable etc.) such that the position of the lounge seat 46 can be selectively adjusted (e.g., the seat 40 can be slid forward, rearward, etc.). The lounge seat 46 can also include a fourth frame portion, shown as leg rest assembly 400. Each or some of the frame portions 100, 200, 300, and 400 can function simultaneously such that the lounge seat 46 does not interfere with interior components in the vehicle 10, as described in more detail below. The lounge seat 46 can be any one of or all of the front seats 42. The lounge seat 46 can be any one of or all of the rear seats 44.

Figure 4:
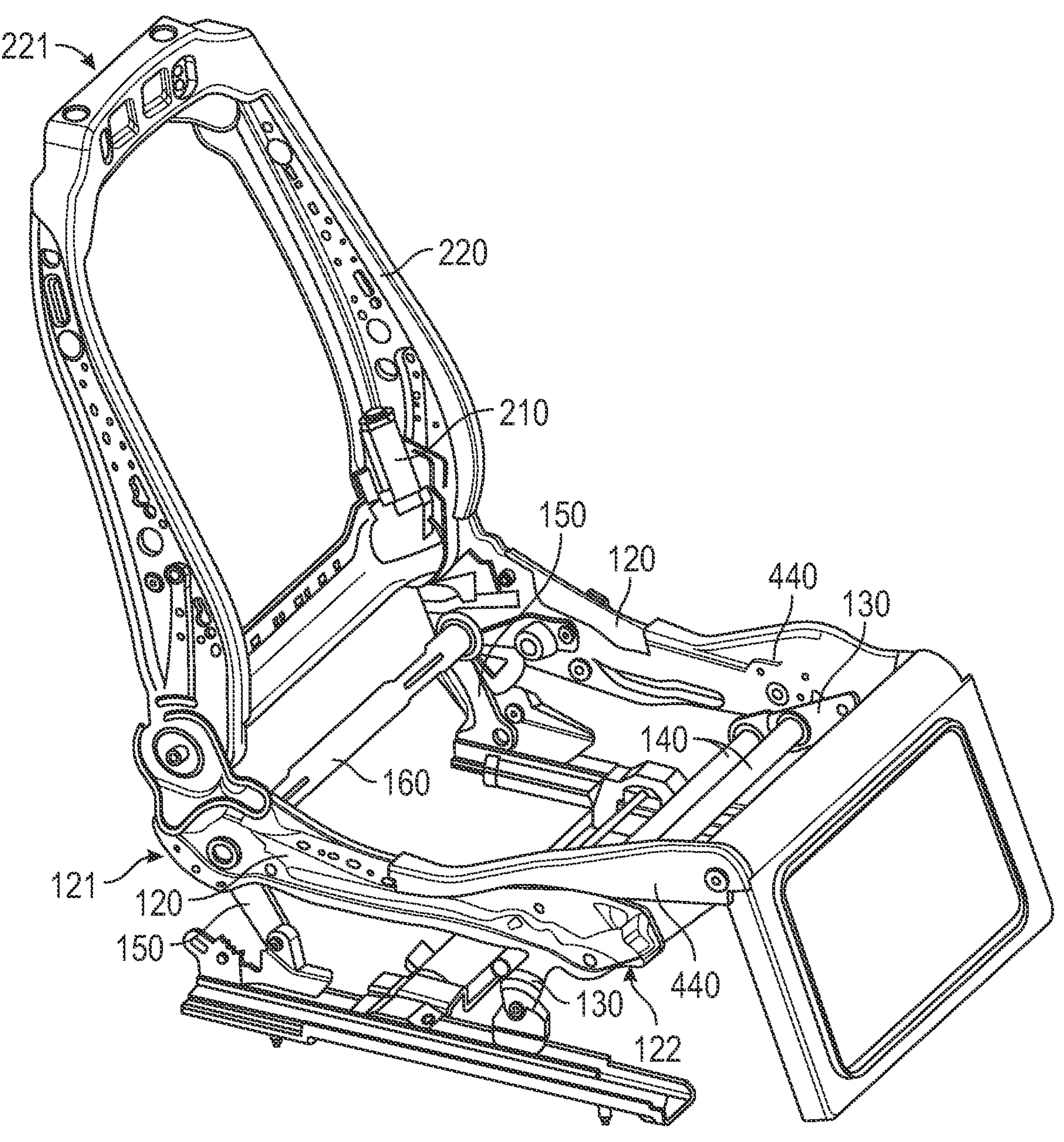
FIGS. 4 and 5 are various detailed perspective views of the seat frame assembly, back frame assembly, track assembly, and leg rest assembly of FIG. 3 including a seatback pivot point, a rearward bracket pivot point, and a leg rest pivot point, according to an exemplary embodiment.
Figure 5:
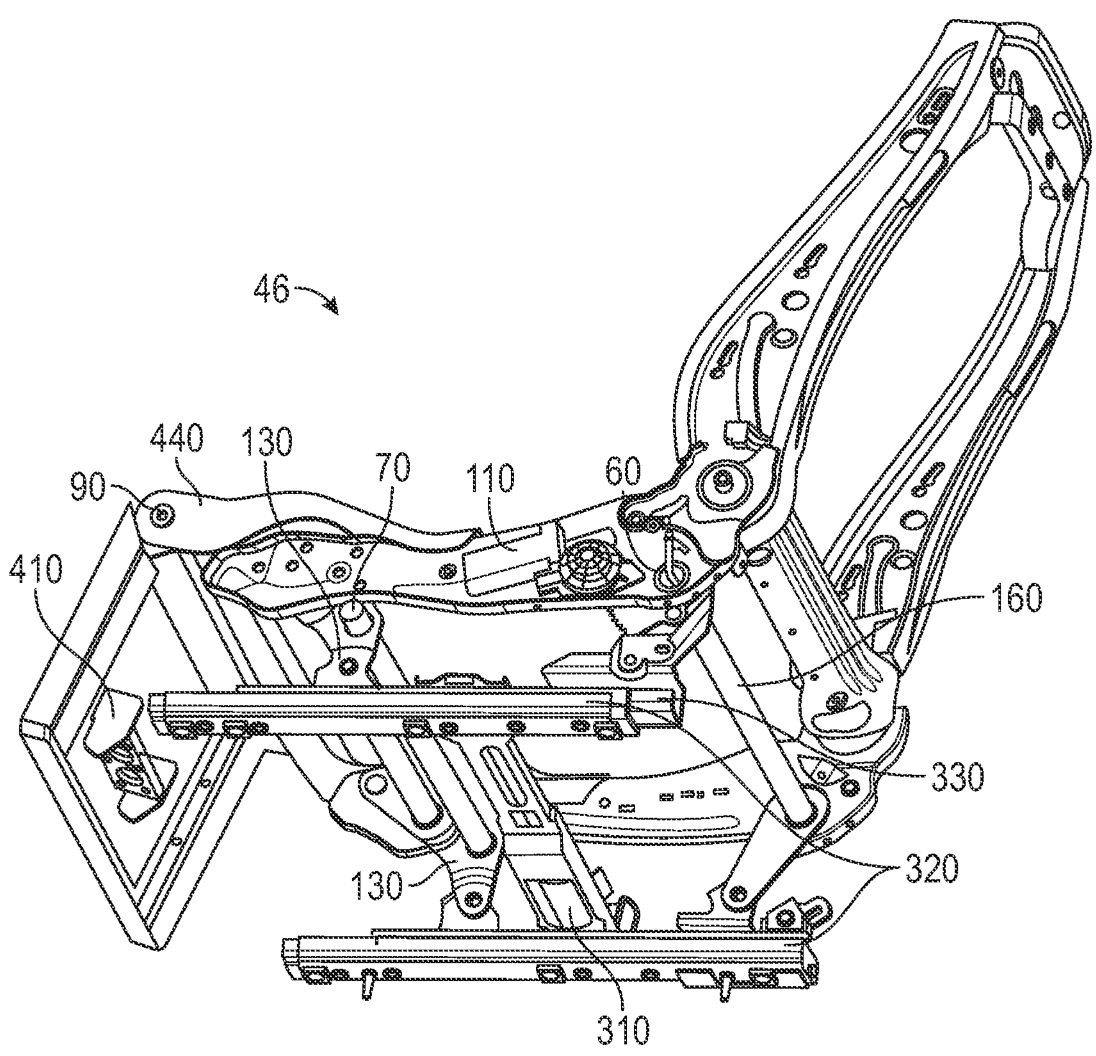

As shown in FIGS. 4 and 5, the seat frame assembly 100 includes a first motor, shown as height adjust motor 110, a first and a second side bar, shown as seat frame members 120, a first and a second front couplers or connectors (e.g., brackets, links, arms, etc.), shown as brackets 130, a first and a second bracket connector, shown as bracket bars 140, a third and a fourth rear coupler or connectors (e.g., brackets, links, arms, etc.), shown as drive links 150, and a member connector, shown as link bar 160. According to an exemplary embodiment, the seat frame members 120 have a first end, shown as end 121, and a second end, shown as end 122. According to an exemplary embodiment, the height adjust motor 110 and the seat frame members 120 are configured to be coupled.

Figure 9:
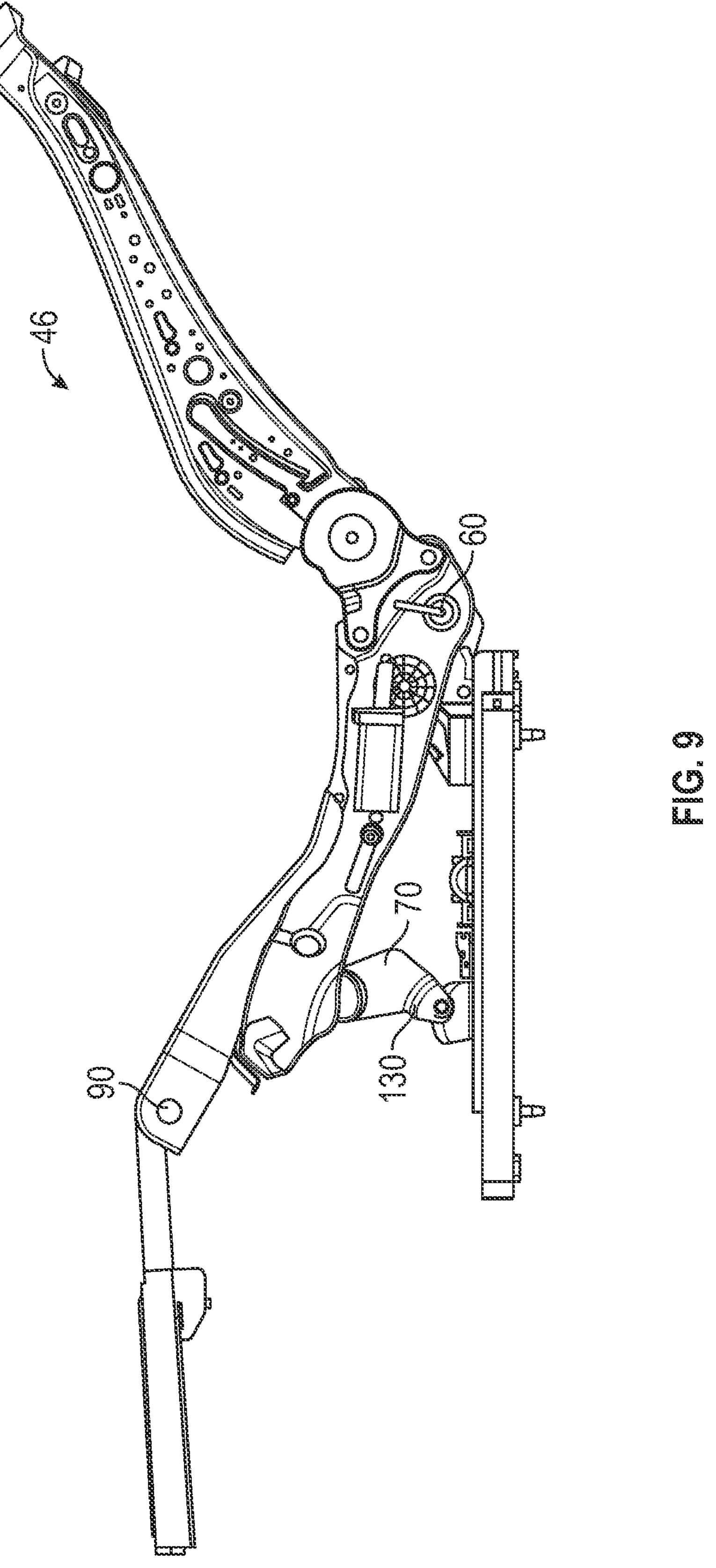
FIG. 9 is a side view of the seat of FIG. 3 in a lounge position, according to an exemplary embodiment.
Figure 10:
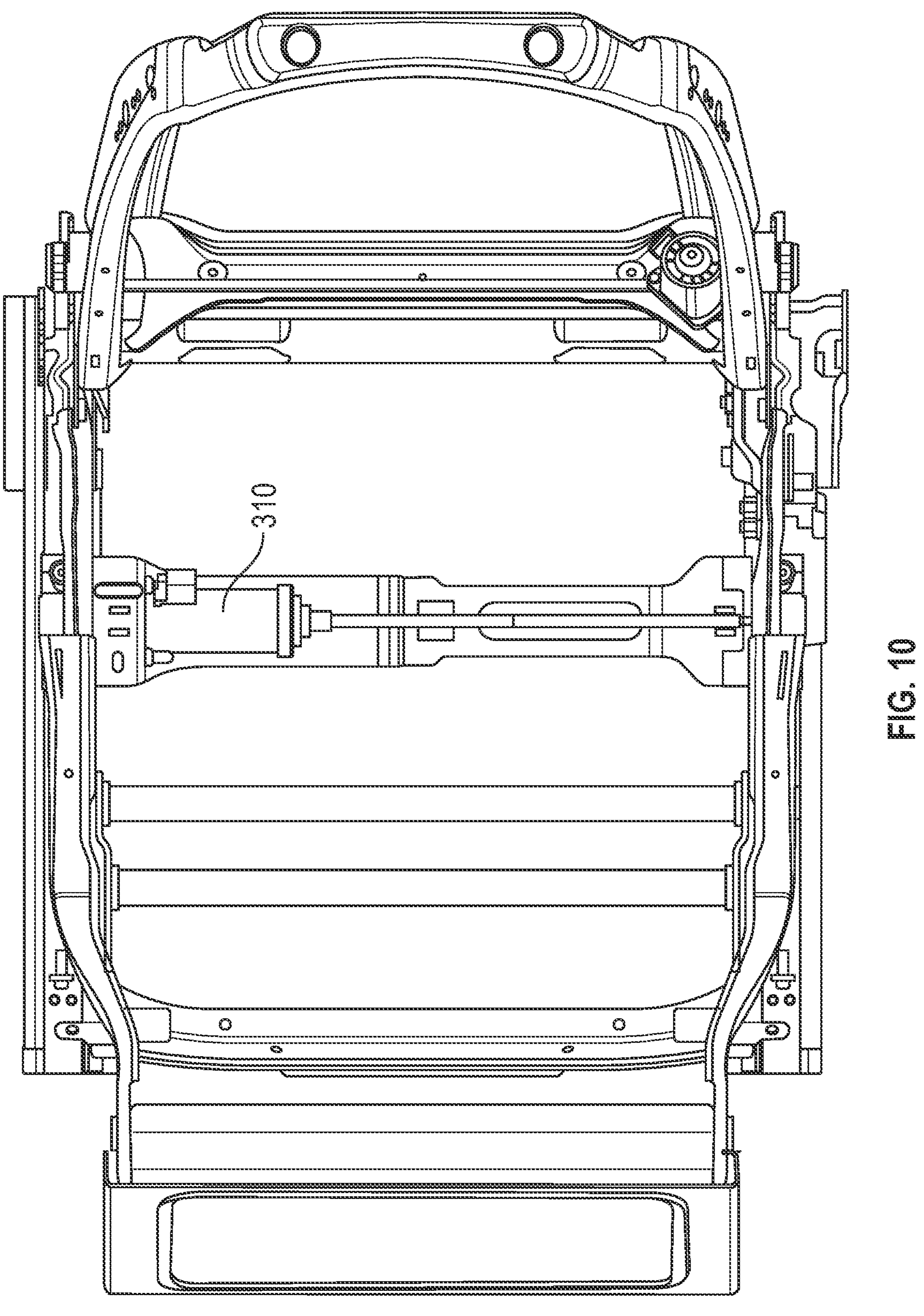
FIG. 10 is a top view of the seat of FIG. 3 in an upright position, according to an exemplary embodiment.
Figure 11:
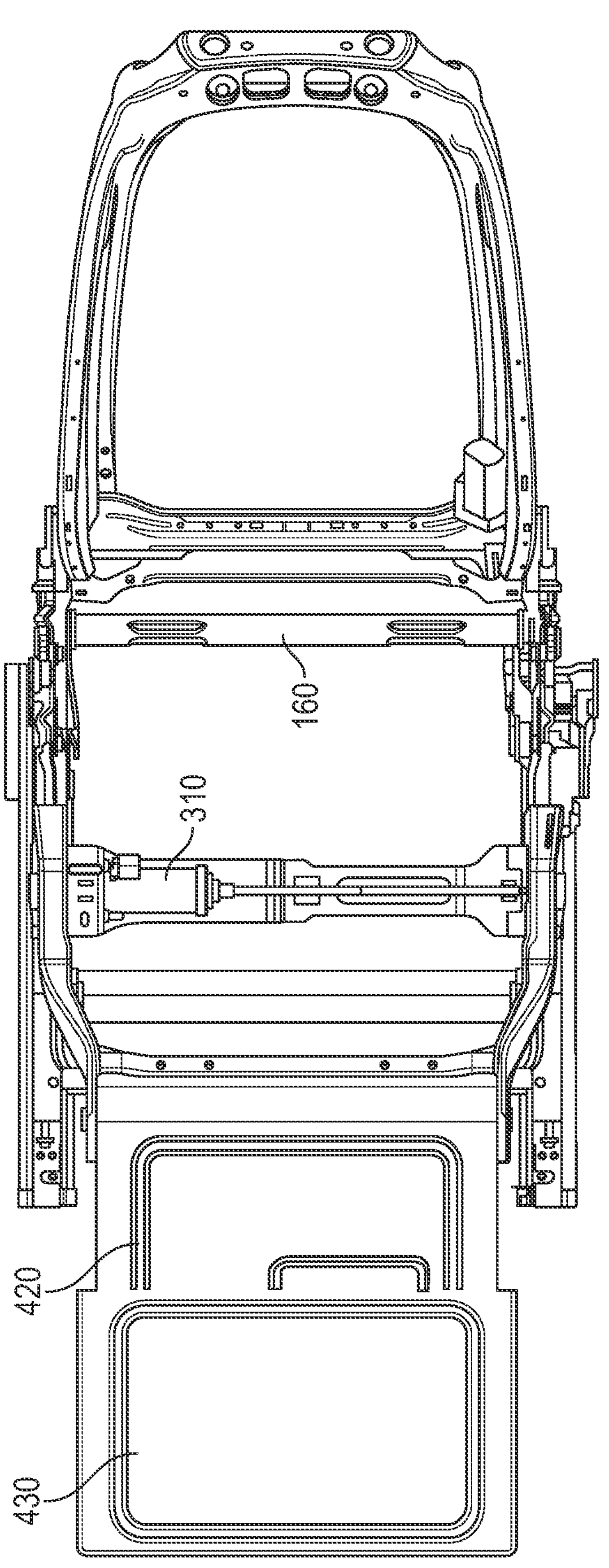
FIG. 11 is a top view of the seat of FIG. 3 in a lounge position, according to an exemplary embodiment.

The height adjust motor 110 can assist the other components described herein to facilitate adjustment of the lounge seat 46 without interference with interior components in the vehicle 10 that are in front of the lounge seat 46, such as a glove compartment (not shown). For example, the height adjust motor 110 can raise the end 122 of the seat frame members 120 while the track assembly 300 can move forward such that the end 122 does not translate in the X Plane more than 3 inches. Since the end 122 does not translate in the X Plane more than 3 inches, the lounge seat 46, including the leg rest assembly 400, can be in the lounge position, as shown in FIG. 9, without contacting the glove compartment.

The height adjust motor 110 can also assist the other components described herein to facilitate adjustment of the lounge seat 46 without interference with interior components in the vehicle 10 that are above the lounge seat 46, such as the roof, sunroof, or hood (not shown). For example, the height adjust motor 110 can facilitate vertical movement of the lounge seat 46 such that as the height adjust motor 110 raises the end 122 of the seat frame members 120, the track assembly 300 moves forward and the drive links 150 facilitate the downward movement of the end 121 of the seat frame members 120 and the back frame assembly 200 in such a way that contact with the rear seats 44 is avoided.

The height adjust motor 110 can assist the other components described herein to facilitate adjustment of the lounge seat 46 without interference with interior components in the vehicle 10 that are below the lounge seat 46, such as the cabin floor 30 or the interior arc of the wheelhouse (not shown). For example, the height adjust motor 110 can raise the end 122 of the seat frame members 120 such that there is no contact with the cabin floor 30 or the interior arc of the wheelhouse.

Still referring to FIGS. 4 and 5, the back frame assembly 200 includes a second motor, shown as recline motor 210, and a back support, shown as back frame 220. The back frame 220 has a top portion, shown as top end 221. The recline motor 210 and the back frame 220 are coupled. The back frame 220 is coupled to the first end 121 of the seat frame members 120, and thereby the seat frame assembly 100 of the lounge seat 46, using fasteners (e.g., bolts, screws, rivets, etc.). In other embodiments, the back frame 220 is welded or otherwise coupled to the seat frame members 120 of the seat frame assembly 100.

The recline motor 210 can assist the other components described herein to facilitate adjustment of the lounge seat 46 without interference with interior components in the vehicle 10 that are above the lounge seat 46, such as the roof, sunroof, or hood (not shown). For example, as the height adjust motor 110 raises the end 122 of the seat frame members 120, and the drive links 150 facilitate the downward movement of the end 121 of the seat frame members 120, the recline motor 210 can rotate the back frame 220 rearward, thus avoiding contact with the roof, sunroof, or hood.

Figure 6:
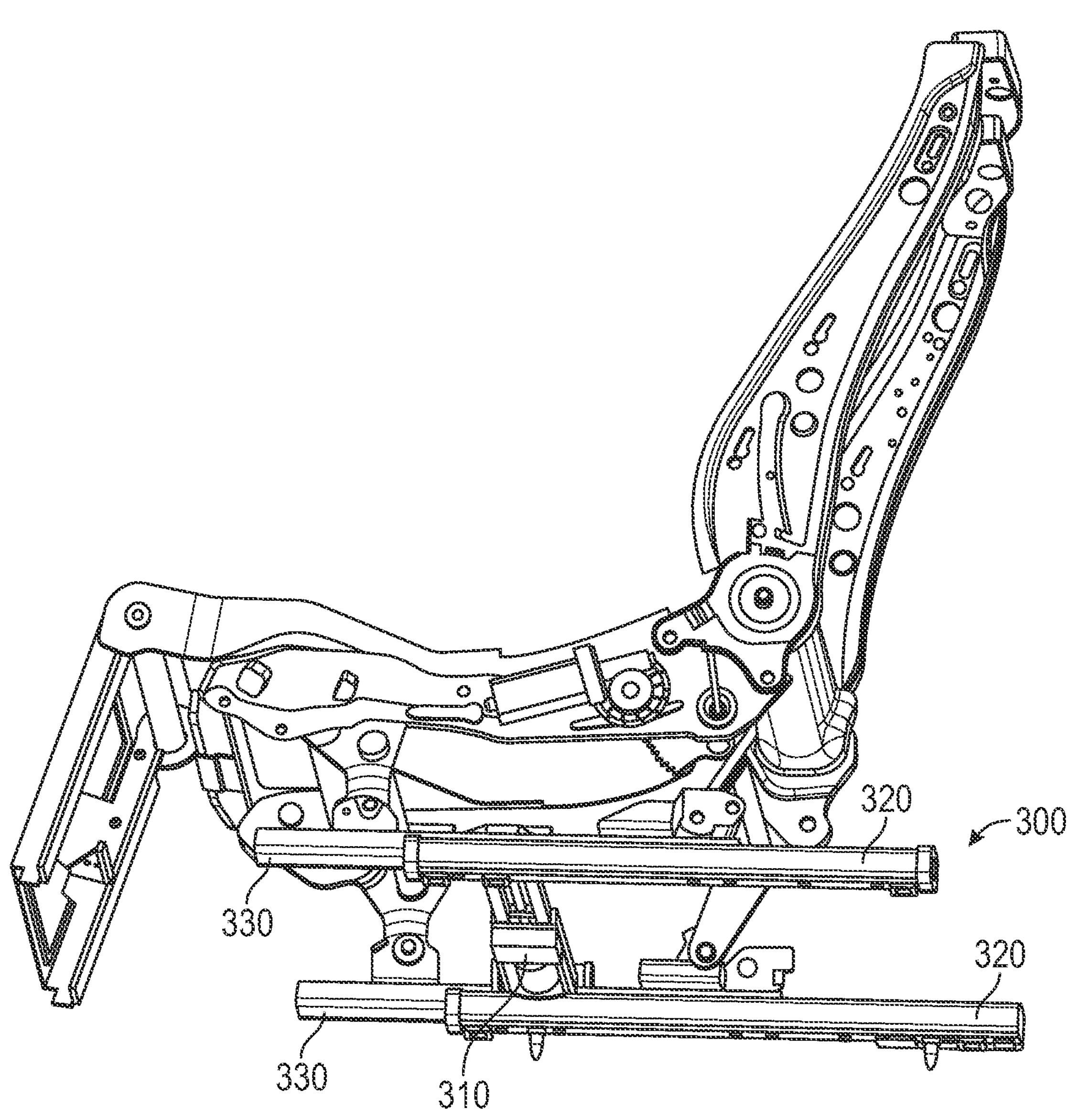
FIG. 6 is a perspective view of the track assembly of FIG. 3, according to an exemplary embodiment.

As shown in FIGS. 3, 5, and 6, the track assembly 300 includes a third motor, shown as track motor 310, a pair of bottom tracks, shown as base tracks 320, and a pair of upper tracks, shown as slideable tracks 330. The track motor 310 and the slideable tracks 330 are coupled. The base tracks 320 and the slideable tracks 330 are slidably coupled such that the slideable tracks 330 can translate forward, as shown in FIG. 6, and backward, as shown in FIG. 5, relative to the base tacks 320. According to an exemplary embodiment, the slideable tracks 330 are coupled to the brackets 130 and the drive links 150, and thereby coupled to the seat frame assembly 100 and the back frame assembly 200, using fasteners (e.g., bolts, screws, rivets, etc.). In other embodiments, the slideable tracks 330 are welded or otherwise coupled to the brackets 130 and the drive links 150 of the seat frame assembly 100. According to an exemplary embodiment, the base tracks 320, and thereby the seat frame assembly 100 and the back frame assembly 200, are configured to couple with the cabin floor 30 of the vehicle 10 using fasteners (e.g., bolts, screws, rivets, etc.). In other embodiments, the base tracks 320 are welded or otherwise coupled to the cabin floor 30 of the vehicle 10. The track motor 310 can articulate motion of the lounge seat 46 in the X Plane. Frontward and rearward directions define the X Plane. The track motor 310 can move the lounge seat 46 to a full rearward position such that the lounge seat 46 cannot translate further back in the X Plane. The track motor 310 can move the lounge seat 46 to a full forward position such that the lounge seat 46 cannot translate further forward in the X Plane. The track motor 310 can move the lounge seat 46 to any position between the full forward position and the full rearward position. The track motor 310 can assist the other components described herein to facilitate adjustment of the lounge seat 46 without interference with interior components in the vehicle 10 that are in front of the lounge seat 46, such as a glove compartment (not shown). For example, the track motor 310 can facilitate translating the slideable tracks 330 forward to provide space for it to recline, as the height adjust motor 110 raises the end 122 of the seat frame members 120 preventing translation in the X Plane more than 3 inches. Since the end 122 does not translate in the X Plane more than 3 inches, the lounge seat 46, including the leg rest assembly 400, can be in the lounge position, as shown in FIG. 9, without contacting the glove compartment.

The track motor 310 can assist the other components described herein to facilitate adjustment of the lounge seat 46 without interference with interior components in the vehicle 10 that are behind the lounge seat 46, such as the rear seats 44. For example, as the track motor 310 facilitates the slideable tracks 330 to move forward, the drive links 150 facilitate the downward movement of the first end, shown as end 121, of the seat frame members 120 and the back frame assembly 200 in such a way that contact with the rear seats 44 is avoided.

The track motor 310 can assist the other components described herein to facilitate adjustment of the lounge seat 46 without interference with interior components in the vehicle 10 that are above the lounge seat 46, such as the roof, sunroof, or hood (not shown). For example, as the track motor 310 facilitates the slideable tracks 330 to move forward, the drive links 150 pivot to facilitate the downward movement of the end 121 of the seat frame members 120 and the back frame assembly 200, thus avoiding contact with the roof, sunroof, or hood.

The track motor 310 can assist the other components described herein to facilitate adjustment of the lounge seat 46 without interference with interior components in the vehicle 10 that are below the lounge seat 46, such as the cabin floor 30 or the interior arc of the wheelhouse (not shown). For example, as the track motor 310 facilitates the slideable tracks 330 to move forward, the track motor 310 facilitates the drive links 150 to pull the end 121 of the seat frame members 120 forward and down over the track assembly 300, thus avoiding contact with the interior arc of the wheelhouse and the cabin floor 30.

Figure 7:
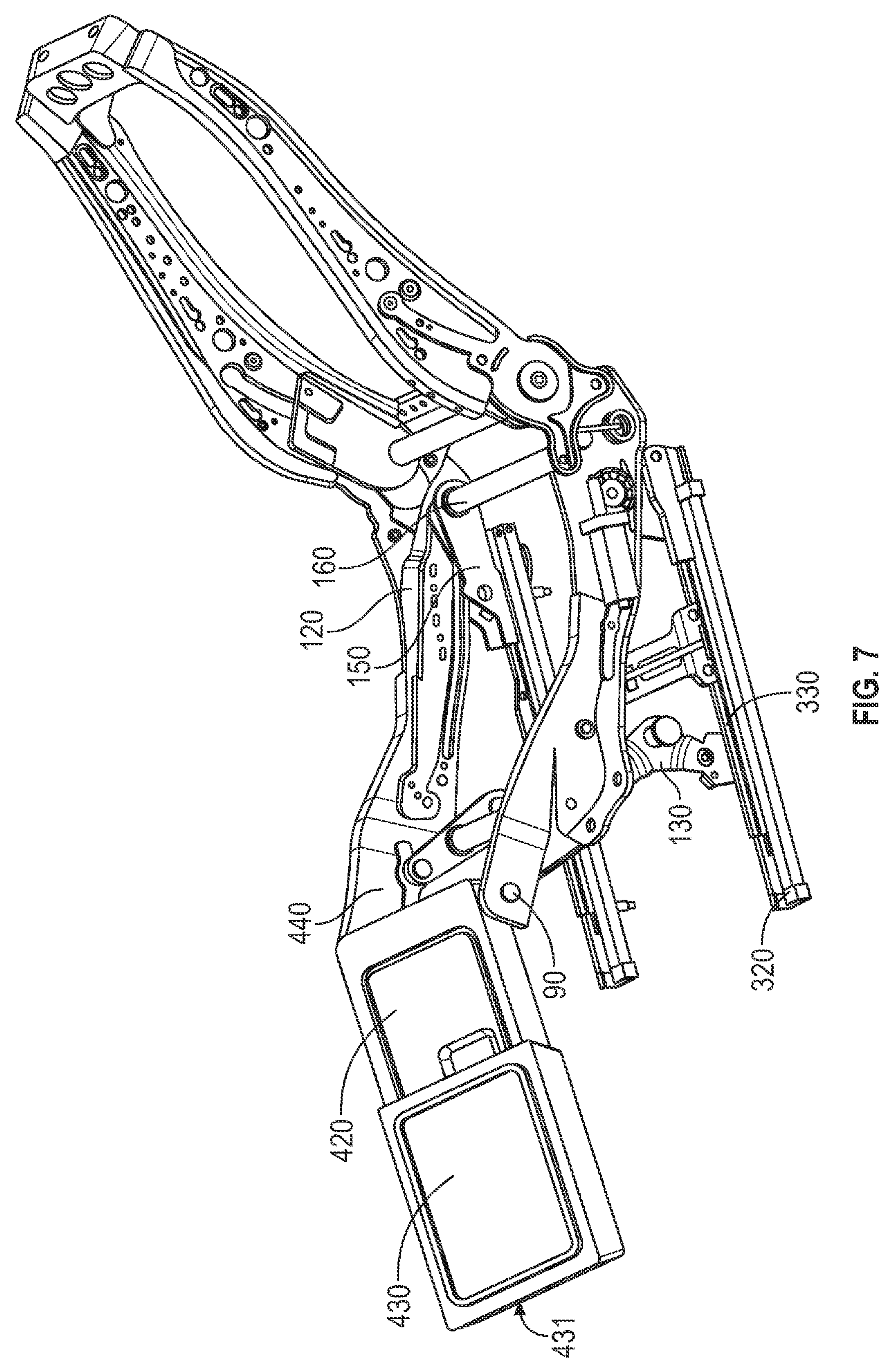
FIG. 7 is a perspective view of the seat of FIG. 3 in a lounge position, according to an exemplary embodiment.

As shown in FIGS. 4, 5, and 7, the leg rest assembly 400 includes a fourth motor, shown as leg rest motor 410, a bottom leg rest platform, shown as leg rest base 420, a top leg rest platform, shown as leg rest extension 430, and a first and a second assembly connector, shown as leg rest links 440. According to an exemplary embodiment, the leg rest extension 430 has an end, shown as end 431. The leg rest motor 410 and the leg rest base 420 are coupled. In other embodiments, the leg rest motor 410 and the leg rest extension 430 are coupled. In other embodiments, the leg rest motor 410 and the leg rest links 440 are coupled. The leg rest base 420 and the leg rest extension 430 are coupled. In other embodiments, the leg rest base 420 is welded or otherwise coupled to the leg rest extension 430. According to another exemplary embodiment, the leg rest links 440 are configured to facilitate coupling the leg rest base 420, and thereby the leg rest extension 430, to the seat frame members 120 of the seat frame assembly 100 of the lounge seat 46 using fasteners (e.g., bolts, screws, rivets, etc.). In other embodiments, the leg rest links 440 are welded or otherwise coupled to the leg rest base 420 and the seat frame members 120 of the seat frame assembly 100.

As shown in FIG. 5, the lounge seat 46 includes a first rotation point, shown as seatback pivot point 60, a second rotation point, shown as rearward bracket pivot point 70, and a third rotation point, shown as leg rest pivot point 90. Rotation about the pivot points 60, 70, and 90 can be facilitated using any electrical, electromechanical, or mechanical means (e.g., brackets, links, gears, etc.) such that there can be power and non-power seat adjustment mechanisms that achieve the desired rotation. According to an exemplary embodiment, the drive links 150 of the seat frame assembly 100 are configured to facilitate coupling the slideable tracks 330 to the seat frame members 120 at the seatback pivot point 60. According to an exemplary embodiment, the link bar 160 is configured to facilitate coupling the seat frame members 120 at the seatback pivot point 60. In other embodiments, the seat frame members 120 rotate about the seatback pivot point 60. In other embodiments, the back frame 210 rotates about the seatback pivot point 60. According to an exemplary embodiment, at least one of the bracket bars 140 is coupled at the rearward bracket pivot point 70. According to an exemplary embodiment, the leg rest links 440 of the leg rest assembly 400 are configured to facilitate coupling the leg rest base 420 to the seat frame members 120 at the leg rest pivot point 90. The leg rest base 420, and thereby the leg rest extension 430, rotates about the leg rest pivot point 90.

Figure 8:
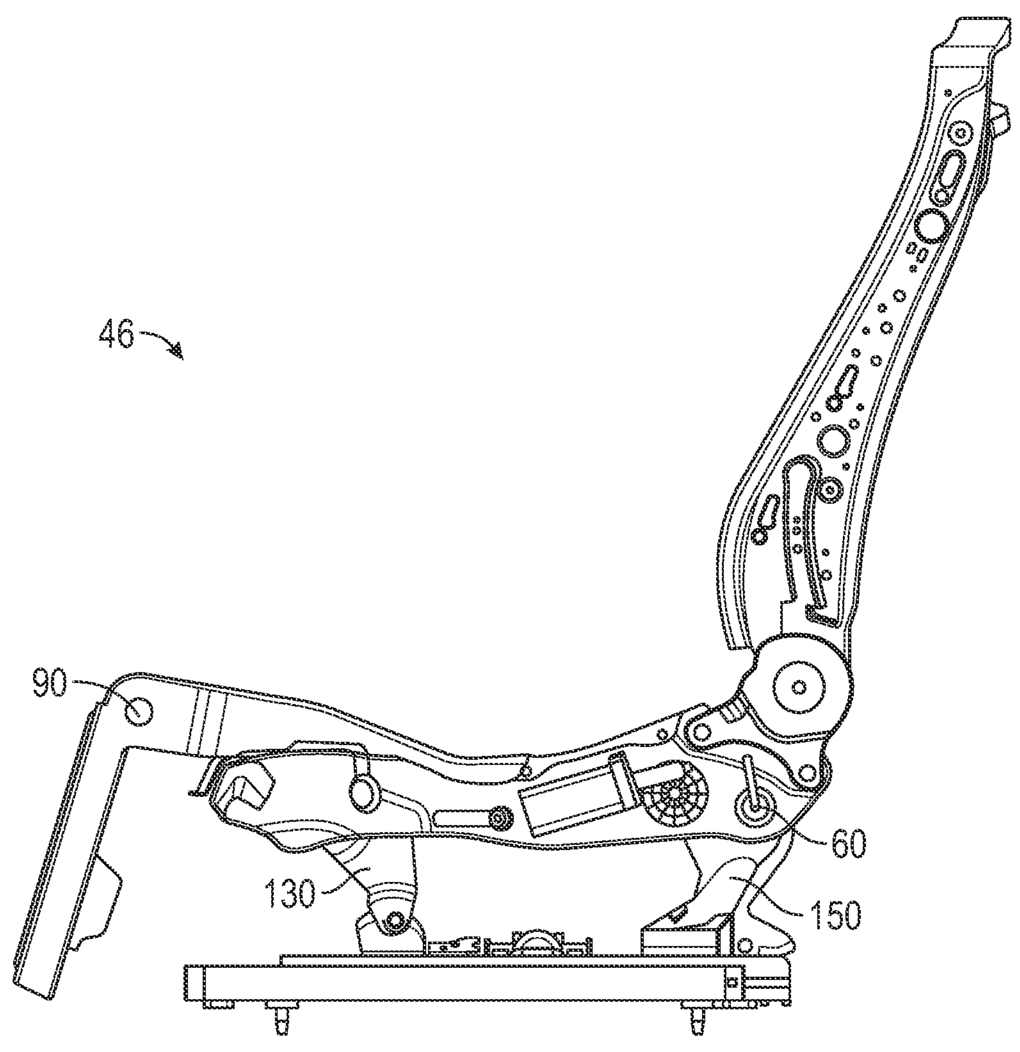
FIG. 8 is a side view of the seat of FIG. 3 in a full upright position, according to an exemplary embodiment.

As shown in FIGS. 8 and 9, the lounge seat 46 can be adjusted from a first or a full upright position, as shown in FIG. 8, to a second or lounge position, as shown in FIG. 9. The lounge position depicted in FIG. 9 can also be referred to as the full downward position of the lounge seat 46. Some or all of the motors 110, 210, 310, 410 can articulate the lounge seat 46 from the full upright position as shown in FIG. 8 to the lounge position as shown in FIG. 9 in a time greater than 5 seconds and less than 15 seconds. For example, the motors 110, 210, 310 can adjust the lounge seat 46 from the full upright position as shown in FIG. 8 to the lounge position as shown in FIG. 9 in 10 second. According to an exemplary embodiment, when the lounge seat 46 is in the first position, as shown in FIG. 8, the end 121 the end 122 of the seat frame members 120 are relatively level (e.g., the second end 122 can be between 0 and 5 degrees above or below the first end 121). According to an exemplary embodiment, when the lounge seat 46 is in the second position, as shown in FIG. 9, the end 122 of the seat frame members 120 are between 5 and 35 degrees above the end 121 of the seat frame members 120. In other embodiments, when the lounge seat 46 is in the second position, as shown in FIG. 9, the end 122 of the seat frame members 120 is about 20 degrees above the end 121 of the seat frame members 120.

Still referring to FIGS. 8 and 9, the lounge seat 46 can be adjusted from the full upright position, as shown in FIG. 8, to the lounge position, as shown in FIG. 9, using the height adjust motor 110, the recline motor 210, the track motor 310, and the leg rest motor 410. In other embodiments, the lounge seat 46 can be adjusted from the full upright position, as shown in FIG. 8, to the lounge position, as shown in FIG. 9, using the height adjust motor 110, the recline motor 210, and the track motor 310. According to an exemplary embodiment, all motors can function simultaneously with each other or independently. All motors can be electrical, mechanical, or electro-mechanical motors (e.g., AC brushless motor, DC brushed motor, DC shunt motor, servo motor, stepper motor, cte.). While the concepts discussed herein are described in the concept of four separate motors, they may also have more or less motors. For example, the height adjust motor 110 can facilitate the movement described herein and also facilitate the movement described herein with respect to the recline motor 210, thus resulting in three total motors instead of four.

Still referring to FIGS. 8 and 9 and according to an exemplary embodiment, the height adjust motor 110 rotates the seat frame assembly 100 from the first position to the second position. As the height adjust motor 110 rotates the seat frame assembly 100, the drive links 150 pivot to lower the link bar 160, and thus lower the end 121 of the seat frame members 120, whereas the brackets 130 pivot to raise the bracket bars 140, and thus raise the end 122 of the seat frame members 120. As the height adjust motor 110 rotates the seat frame assembly 100 from the first position to the second position, the back frame assembly 200 may rotate backward around the seatback pivot point 60. The height adjust motor 110 may function simultaneously with or independently from the recline motor 210, the track motor 310, and the leg rest motor 410.

Still referring to FIGS. 8 and 9 and according to an exemplary embodiment, the recline motor 210 can rotate the back frame assembly 200 (about a pivot point between the back frame assembly 200 and the seat frame assembly 100) from the first position to the second position. In other embodiments, as the recline motor 210 rotates the back frame assembly 200, the top end 221 rotates backward around the seatback pivot point 60. The recline motor 210 may function simultaneously with or independently from the height adjust motor 110, the track motor 310, and the leg rest motor 410.

Still referring to FIGS. 8 and 9 and according to an exemplary embodiment, the track motor 310 can translate the slideable tracks 330, and thereby the seat frame assembly 100, from the first position to the second position. The track motor 310 may function simultaneously with or independently from the height adjust motor 110, the recline motor 210, and the leg rest motor 410.

Still referring to FIGS. 8 and 9 and according to an exemplary embodiment, the leg rest motor 410 can rotate the leg rest base 420, and thereby the leg rest extension 430, from the first position to the second position. As the leg rest motor 410 rotates the leg rest base 420, and thereby the leg rest extension 430, the end 431 of the leg rest extension 430 rotates upward around the leg rest pivot point 90. According to an exemplary embodiment, the leg rest motor 410 can translate the leg rest extension 430 inward and outward from the leg rest base 420, from the first position to the second position. In other embodiments, the leg rest motor 410 is configured to pivot or unfold the leg rest extension 430 from the leg rest base 420. The leg rest motor 410 may function simultaneously with or independently from the height adjust motor 110, the recline motor 210, and the track motor 310.

Figure 12A:
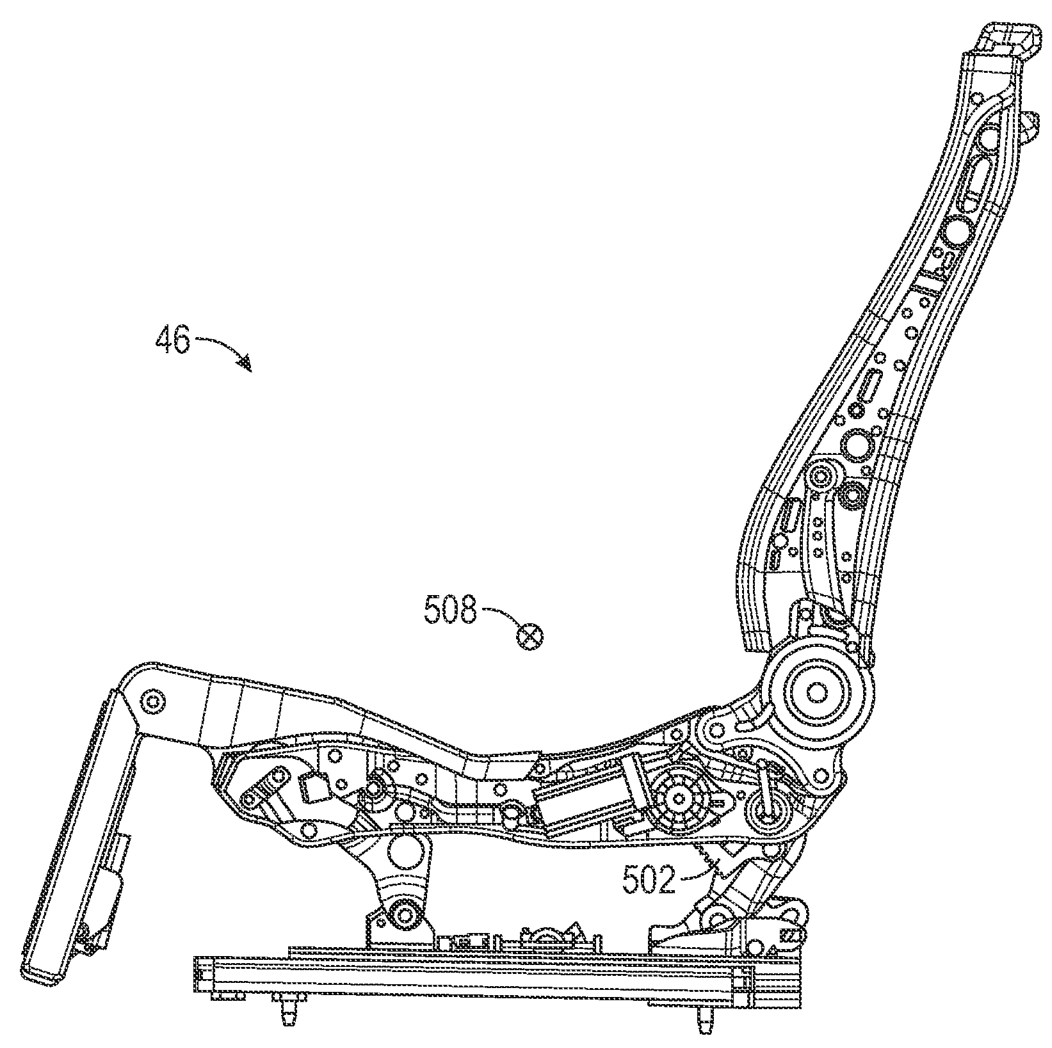
FIGS. 12A and 12B are side views of the seat of FIG. 3 transitioning between a full upright position and a full down position with track movement, according to an exemplary embodiment.
Figure 12B:
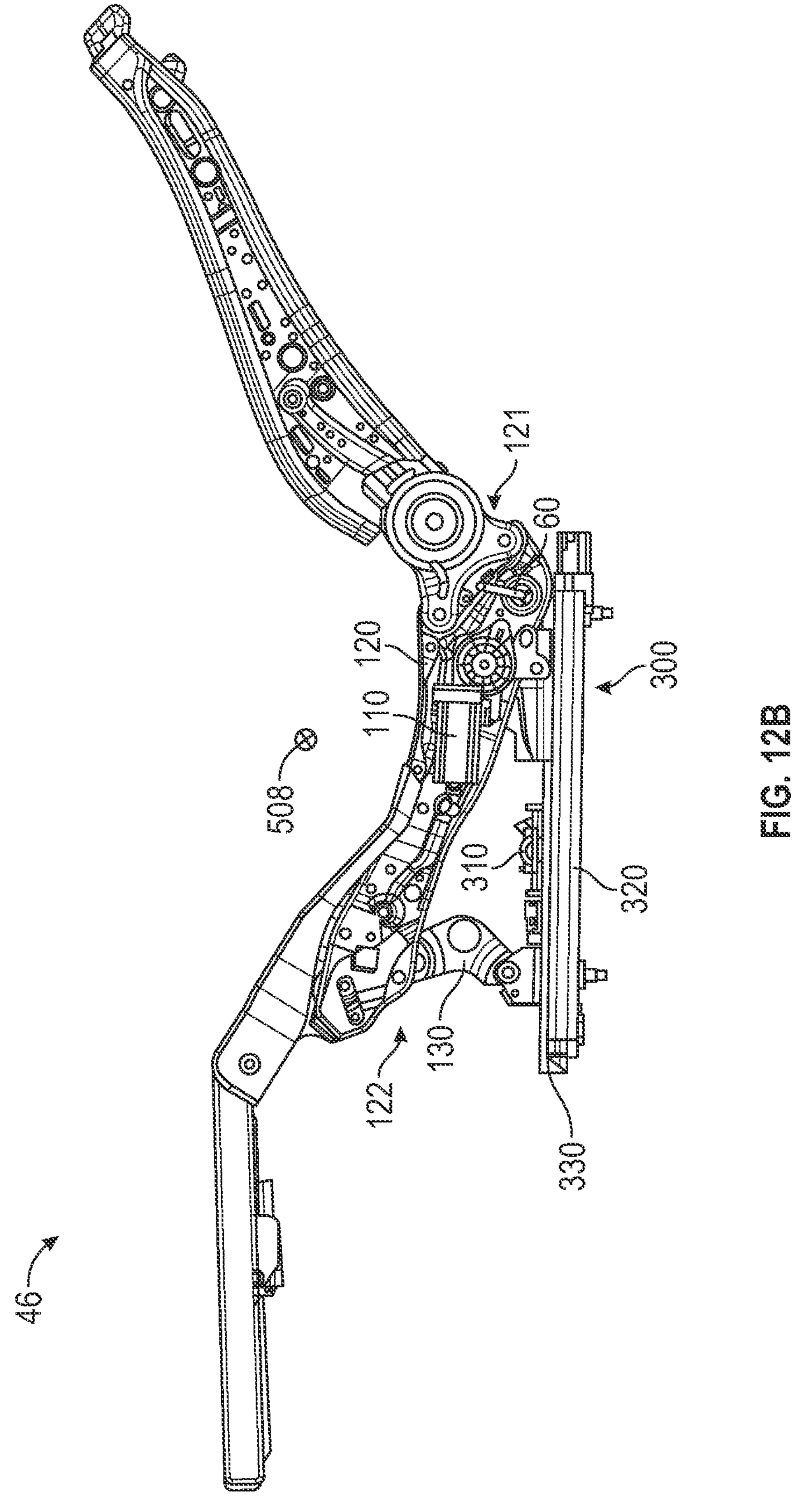
Figure 13:
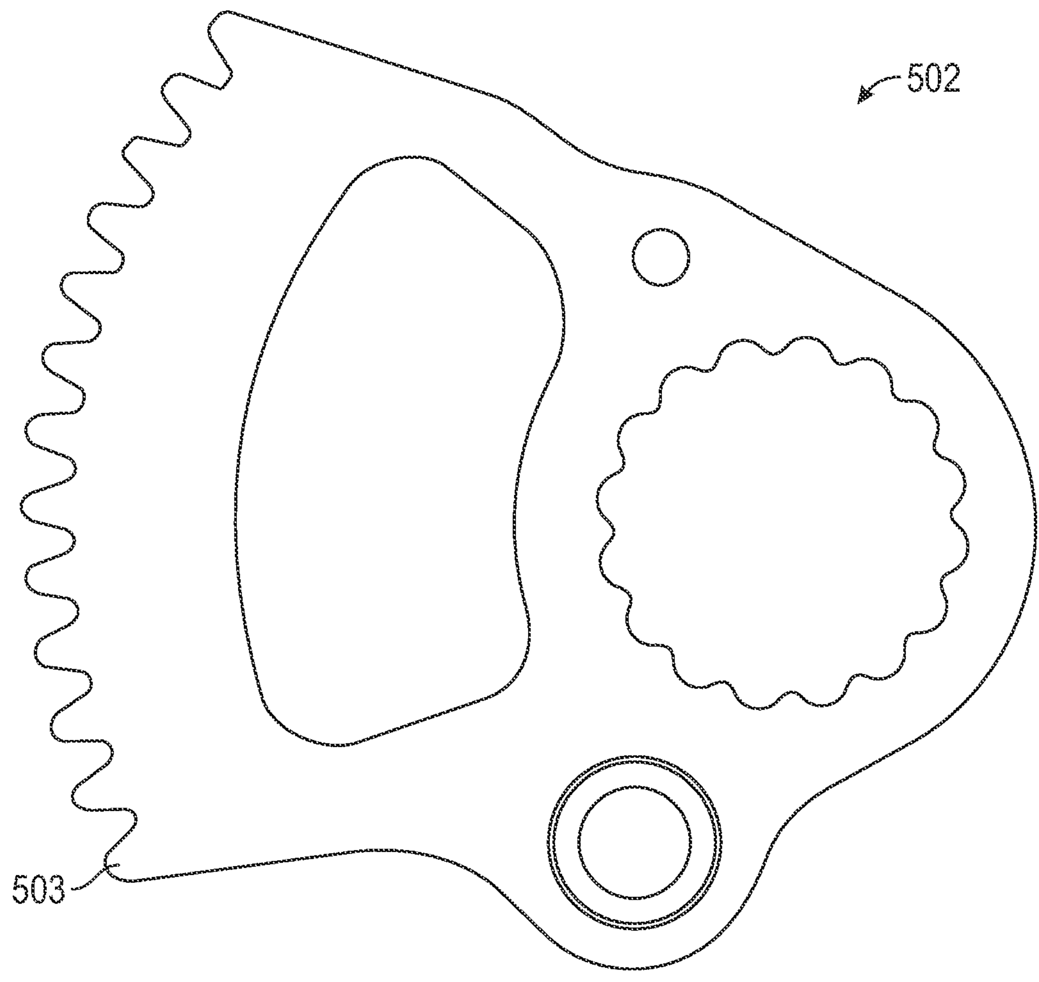
FIG. 13 depicts the gear of FIG. 12, according to an exemplary embodiment.

As shown in FIGS. 12A and 13, the lounge seat 46 is in the full upright position and includes a gear 502, and a seating reference point, shown as SgRP 508. As shown in FIG. 12B, the lounge seat 46 is in the full down or lounge position.

Still referring to FIGS. 12A-13 and according to an exemplary embodiment, the gear 502 defines or is positioned along the seatback pivot point 60. The gear 502 can have a range of between 30 degrees and 90 degrees. In one embodiment, the gear 502 has a range between 60 and 70 degrees (e.g., about 63 degrees, about 67 degrees, etc.). The gear 502 has a plurality of teeth 503. Each of the plurality of teeth 503 can have a range or pitch of between 1 degree and 11 degrees. In one embodiment, each of the plurality of teeth 503 has a range or pitch of about 6 degrees (e.g., 5.7 degrees, etc.). The gear 502 can be coupled with the drive links 150. The gear 502 can be coupled with the seat frame members 120. The gear 502 can be coupled with the link bar 160. There can be more than one gear 502, such that there is a second gear (not shown) in symmetry with the gear 502. According to an exemplary embodiment, the gear 502 is actuated by the height adjust motor 110, which causes (i) pivoting of (a) the end 121 of the seat frame members 120 and the drive links 150 about the seatback pivot point 60 and (b) the drive links 150 relative to the slideable track 330 and, thereby, the height of the end 121 to drop or dip and (ii) pivoting of (a) the end 122 of the seat frame members 120 and the brackets 130 and (b) the brackets 130 relative to the slideable track 330 and, thereby, the height of the end 122 to lift.

Still referring to FIGS. 12A and 12B and according to an exemplary embodiment, the SgRP 508 is the center point of the lounge seat 46. The SgRP 508 travels in an arc shape as the lounge seat 46 moves from the full upright position depicted in FIGS. 8 and 12A to the lounge position depicted in FIGS. 9 and 12B. For example, the SgRP 508 travels in both the X Plane and the Z Plane as the lounge seat 46 moves from the full upright position to the lounge position. However, the SgRP 508 remains constant or substantially constant in the X Plane with respect to the full upright position depicted in FIG. 12A and the lounge position depicted in FIG. 12B, whereas the SgRP 508 does not remain constant in the X Plane with respect to the full upright position depicted in FIG. 8 and the lounge position depicted in FIG. 9. The difference between the two sets (FIGS. 8 and 9 versus FIGS. 12A and 12B) being the translation of the lounge seat 46 along the track assembly 300 while the lounge seat 46 is transitioned between the full upright position and the full down or lounge position. For example, the SgRP 508 is at the same or substantially the same point in the X Plane in both the full upright position depicted in FIG. 12A and the lounge position depicted in FIG. 12B, whereas the SgRP 508 is not at the same or substantially the same point in the X Plane in both the full upright position depicted in FIG. 8 and the lounge position depicted in FIG. 9. It should be understand that "constant" and "same point" allow for a tolerance. The tolerance can be between 0 and 35 millimeters. For example, the SgRP 508 corresponding to the full upright position depicted in FIG. 12A can be less than or equal to 20 millimeters forward or rearward (i.e., along the X Plane) from the SgRP 508 corresponding to the lounge position depicted in FIG. 12B. The SgRP 508 is not constant in the Z Plane with respect to the full upright position depicted in FIGS. 8 and 12A and the lounge position depicted in FIGS. 9 and 12B. For example, the SgRP 508 of the lounge seat 46 in the full upright position depicted in FIGS. 8 and 12A is above the SgRP 508 of the lounge seat 46 in the lounge position depicted in FIGS. 9 and 12B.

Figure 14:
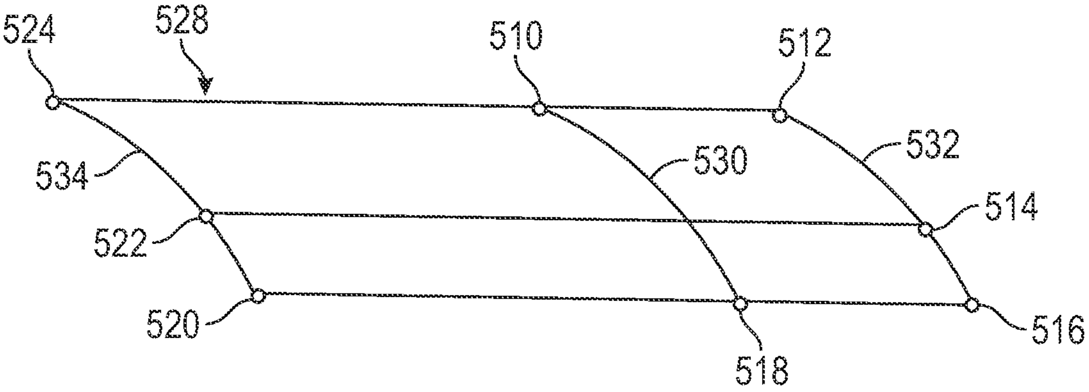
FIG. 14 depicts a travel box of the SgRP, according to an exemplary embodiment.

As shown in FIG. 14 and according to an exemplary embodiment, the lounge seat 46 can include a plurality of SgRPs 510-524. FIG. 14 also depicts a travel box 528, which includes a first arc 530, a second arc 532, and a third arc 534. The arcs 530, 532, 534 can be defined by an arc formula as described in greater detail herein. The plurality of SgRPs 510-524 represent the paths the SgRP 508 can travel during articulation of the lounge seat 46. The total paths the SgRP 508 can travel is represented by the travel box 528. The SgRP 508 can be anywhere within and along the travel box 528. For example, the travel box 528 depicts the maximum boundaries of movement the lounge seat 46 can experience. The paths the SgRP 508 can travel as the lounge seat 46 articulates from the full upright position to the lounge position can be represented by the first arc 530, the second arc 532, and the third arc 534, as discussed in more detail below. The SgRP 508 can travel in additional arcs (not shown). For example, the SgRP 508 can travel in shorter arcs, which represent the lounge seat 46 articulating from a third position to a fourth position. The third position can be the full upright position so long as the fourth position is not the lounge position. The third position can be a position other than the full upright position. The fourth position can be the lounge position so long as the third position is not the full upright position. The fourth position can be a position other than the lounge position.

The plurality of SgRPs 510-524 can include a first SgRP 510. The first SgRP 510 represents the center point of the lounge seat 46 when the lounge seat 46 is in the full upright position and is in a position between the full forward position and the full rearward position, both as defined above. For example, the SgRP 508 can be the same as the first SgRP 510. The plurality of SgRPs 510-524 can include a second SgRP 518. The second SgRP 518 represents the center point of the lounge seat 46 when the lounge seat 46 is in the full downward position, also referred to as the lounge position, and is in a position between the full forward position and the full rearward position, both as defined above.

The plurality of SgRPs 510-524 can include a third SgRP 512. The third SgRP 512 represents the center point of the lounge seat 46 when the lounge seat 46 is in the full upright position and is also in the full rearward position as defined above. The plurality of SgRPs 510-524 can include a fourth SgRP 516. The fourth SgRP 516 represents the center point of the lounge seat 46 when the lounge seat 46 is in the full downward position, also referred to as the lounge position, and is also in the full rearward position as defined above. The plurality of SgRPs 510-524 can include a fifth SgRP 514. The fifth SgRP 514 represents the center point of the lounge seat 46 when the lounge seat 46 is in the full rearward position as defined above and the lounge seat 46 is in a position between the full upright position and the full downward position, also referred to as the lounge position.

The plurality of SgRPs 510-524 can include a sixth SgRP 524. The sixth SgRP 524 represents the center point of the lounge seat 46 when the lounge seat 46 is in the full upright position and is also in the full forward position as defined above. The plurality of SgRPs 510-524 can include a seventh SgRP 520. The seventh SgRP 520 represents the center point of the lounge seat 46 when the lounge seat 46 is in the full downward position, also referred to as the lounge position, and is also in the full forward position as defined above. The plurality of SgRPs 510-524 can include an eighth SgRP 522. The eighth SgRP 522 represents the center point of the lounge seat 46 when the lounge seat 46 is in the full forward position as defined above and the lounge seat 46 is in a position between the full upright position and the full downward position, also referred to as the lounge position.

As mentioned above, the SgRP 508 travels in an arc shape as the lounge seat 46 moves from the full upright position to the lounge position. For example, the first SgRP 510 can represent the starting point of the SgRP 508 of the lounge seat 46 and the second SgRP 518 can represent the ending point of the SgRP 508. The SgRP 508 can travel the path defined by the first arc 530 as the SgRP 508 translates from the first SgRP 510 to the second SgRP 518. In another example, the third SgRP 512 can represent the starting point of the SgRP 508 of the lounge seat 46 and the fourth SgRP 516 can represent the ending point of the SgRP 508. The SgRP 508 can travel the path defined by the second arc 532 as the SgRP 508 translates from the third SgRP 512 to the fourth SgRP 516. In another example, the sixth SgRP 524 can represent the starting point of the SgRP 508 of the lounge seat 46 and the seventh SgRP 520 can represent the ending point of the SgRP 508. The SgRP 508 can travel the path defined by the third arc 522 as the SgRP 508 translates from the sixth SgRP 524 to the seventh SgRP 520.

Figure 15:
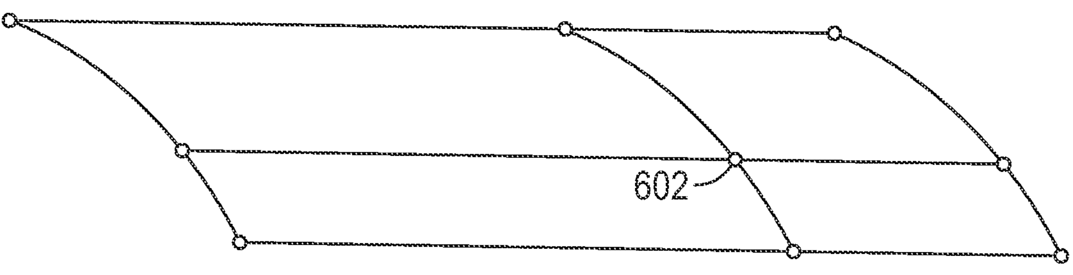
FIG. 15 depicts a travel box that includes the position of a first SgRP of a typical seat.

FIG. 15 depicts a travel box that includes the position of a first SgRP of a typical seat, shown as typical seat SgRP 602. The typical seat SgRP 602 represents the center point of a typical seat in a full upright position. The typical seat SgRP 602 is not the same point in the X-Z Planes as the first SgRP 510, the third SgRP 512, or the sixth SgRP 524, which can all represent a starting point of the SgRP 508 of the lounge seat 46.

In one embodiment, the parts of the seat frame assembly 100, the back frame assembly 200, the track assembly 300, and the leg rest assembly 400 are manufactured from a metal material, such as spring steel. In another embodiment, the parts of the seat frame assembly 100, the back frame assembly 200, the track assembly 300, and the leg rest assembly 400 are manufactured from a plastic material.

The Applicant has conducted testing with the lounge seat 46 described herein to identify (a) the arc formula that defines the motion of the SgRP 508 in the X plane as the lounge seat 46 is transitioned between the full upright position to the full down or lounge position, (b) the amount of time and speeds required to transition the lounge seat 46 between the full upright position and the full down position, (c) the deviation of the SgRP 508 in the forward/rearward direction of the X plane (i.e., the X direction) between when the lounge seat 46 is in the full upright position and the full down position, and (d) the maximum deviation of the SgRP 508 in the forward/rearward directions of the X plane as the lounge seat 46 is transitioned between the full upright position and the full down position.

Specifically, the Applicant performed two separate tests: (i) a first test where movement of the SgRP 508 in the X direction and the Z direction was tracked as the lounge seat 46 was transitioned between the full upright position and the full down or lounge position without any movement of the lounge seat 46 along the track assembly 300 (i.e., the track motor 310 was not used) (like shown in FIGS. 8 and 9) and (ii) a second test where movement of the SgRP 508 in the X direction and the Z direction was tracked as the lounge seat 46 was transitioned between the full upright position and the full down or lounge position with movement of the lounge seat 46 along the track assembly 300 (like shown in FIGS. 12A and 12B). The results of the first test are shown in Table 1 below, while the results from the second test are shown in Table 2 below. The results of Table 1 and Table 2 are also visual shown in the graph of FIG. 16.

TABLE 1

Movement of SgRP without Track Movement

| Position | Angle of Rotation [degrees] | SgRP (w/o track movement) [mm] X Direction | Z Direction | Delta X [mm] |
|---|---|---|---|---|
| 1 | 0 | −85.263 | 55.099 | 0.000 |
| 2 | 3 | −78.255 | 56.285 | 7.008 |
| 3 | 6 | −71.365 | 57.112 | 6.890 |
| 4 | 9 | −64.601 | 57.600 | 6.764 |
| 5 | 12 | −57.969 | 57.768 | 6.632 |
| 6 | 15 | −51.479 | 57.634 | 6.490 |
| 7 | 18 | −45.137 | 57.215 | 6.342 |
| 8 | 21 | −38.952 | 56.526 | 6.185 |
| 9 | 24 | −32.931 | 55.582 | 6.021 |
| 10 | 27 | −27.082 | 54.398 | 5.849 |
| 11 | 30 | −21.412 | 52.987 | 5.670 |
| 12 | 33 | −15.929 | 51.365 | 5.483 |
| 13 | 36 | −10.638 | 49.545 | 5.291 |
| 14 | 39 | −5.547 | 47.540 | 5.091 |
| 15 | 42 | −0.661 | 45.365 | 4.886 |
| 16 | 45 | 4.013 | 43.032 | 4.674 |
| 17 | 48 | 8.470 | 40.555 | 4.457 |
| 18 | 51 | 12.705 | 37.947 | 4.235 |
| 19 | 54 | 16.712 | 35.221 | 4.007 |
| 20 | 57 | 20.488 | 32.389 | 3.776 |
| 21 | 60 | 24.027 | 29.466 | 3.539 |
| 22 | 63 | 27.326 | 26.464 | 3.299 |
| 23 | 66 | 30.381 | 23.395 | 3.055 |
| 24 | 67.3 | 31.628 | 22.047 | 1.247 |

Figure 16:
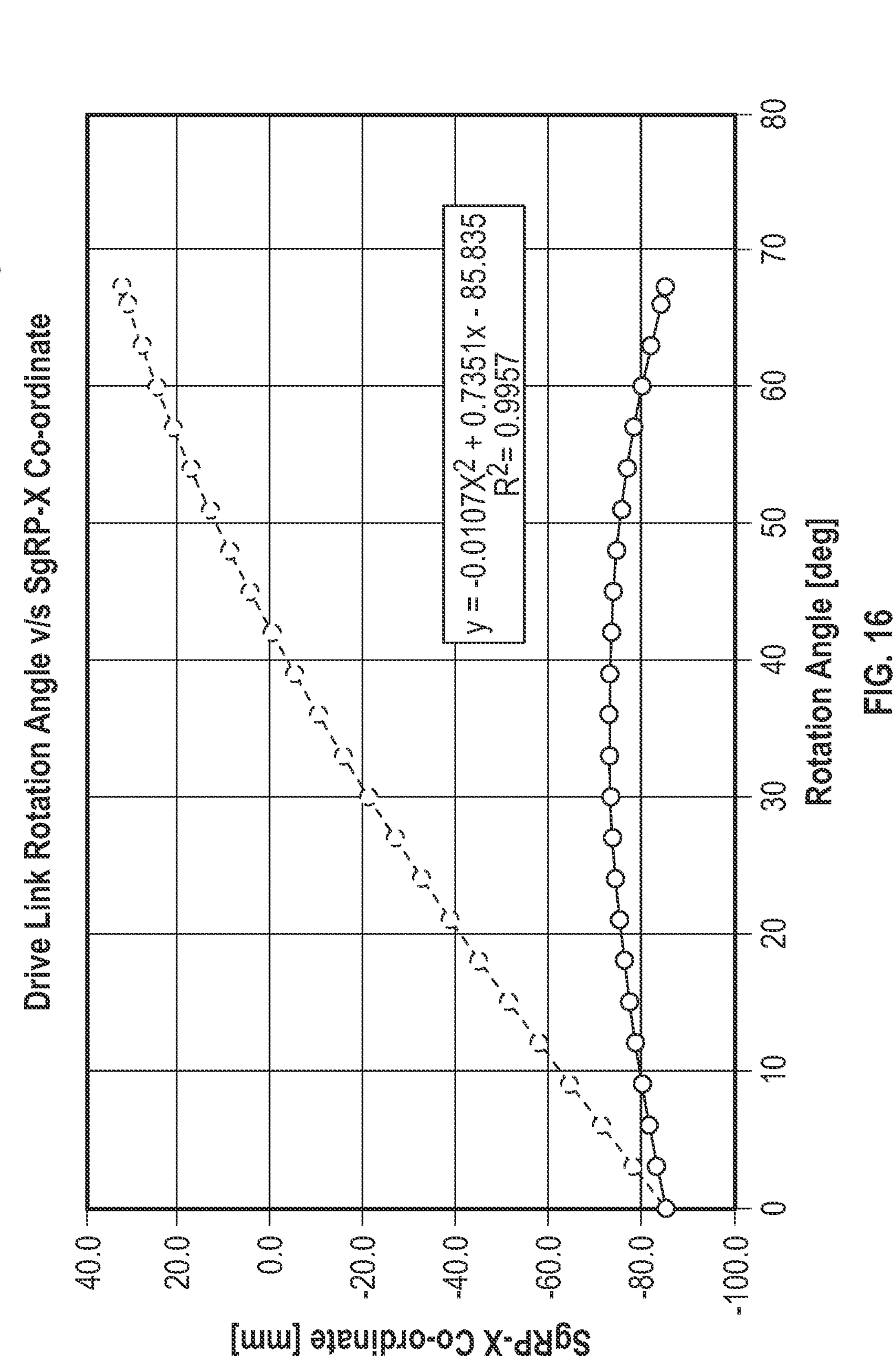
FIG. 16 is a graph showing movement of the SgRP of the seat of FIG. 3 with and without tack movement, according to an exemplary embodiment.

As shown in Table 1 and FIG. 16, as the height adjust motor 110 is driven to actuate (i.e., rotate, pivot) the gear 502 to reposition the lounge seat 46 between the full upright position (position 1) and the full down or lounge position (position 24) without activating the track motor 310, the SgRP 508 of the lounge seat 46 moves in the X direction a total of about 116.89 mm.

TABLE 2

Movement of SgRP with Track Movement

| Position | Angle of Rotation [degrees] | Track Travel [mm] | SgRP (w/track movement) [mm] X Direction | Z Direction | Deviation from Initial X Position [mm] |
|---|---|---|---|---|---|
| 1 | 0 | 0 | −85.263 | 55.099 | 0.000 |
| 2 | 3 | 5.21 | −83.465 | 56.285 | −1.798 |
| 3 | 6 | 10.42 | −81.785 | 57.112 | −3.478 |
| 4 | 9 | 15.63 | −80.231 | 57.600 | −5.032 |
| 5 | 12 | 20.84 | −78.809 | 57.768 | −6.454 |
| 6 | 15 | 26.05 | −77.529 | 57.634 | −7.734 |
| 7 | 18 | 31.26 | −76.397 | 57.215 | −8.866 |
| 8 | 21 | 36.47 | −75.422 | 56.526 | −9.841 |
| 9 | 24 | 41.68 | −74.611 | 55.582 | −10.652 |
| 10 | 27 | 46.89 | −73.972 | 54.398 | −11.291 |
| 11 | 30 | 52.10 | −73.512 | 52.987 | −11.751 |
| 12 | 33 | 57.31 | −73.239 | 51.365 | −12.024 |
| 13 | 36 | 62.52 | −73.158 | 49.545 | −12.105 |
| 14 | 39 | 67.73 | −73.277 | 47.540 | −11.986 |
| 15 | 42 | 72.94 | −73.601 | 45.365 | −11.662 |
| 16 | 45 | 78.15 | −74.137 | 43.032 | −11.126 |
| 17 | 48 | 83.36 | −74.890 | 40.555 | −10.373 |
| 18 | 51 | 88.57 | −75.865 | 37.947 | −9.398 |
| 19 | 54 | 93.78 | −77.068 | 35.221 | −8.195 |
| 20 | 57 | 98.99 | −78.502 | 32.389 | −6.761 |
| 21 | 60 | 104.20 | −80.173 | 29.466 | −5.090 |
| 22 | 63 | 109.41 | −82.084 | 26.464 | −3.179 |
| 23 | 66 | 114.62 | −84.239 | 23.395 | −1.024 |
| 24 | 67.3 | 116.88 | −85.250 | 22.047 | −0.013 |

Conversely, as shown in Table 2 and FIG. 16, as the height adjust motor 110 is driven to actuate (i.e., rotate, pivot) the gear 502 to reposition the lounge seat 46 between the full upright position (position 1) and the full down or lounge position (position 24) with activating the track motor 310 to counteract the movement of the SgRP 508 in the X direction, the resultant movement of the SgRP 508 of the lounge seat 46 in the X direction is about 0.013 mm such that the SgRP 508 in the X direction is substantially the same in both the full upright position and the full down or lounge position. Further, at any given position between the full upright position and the full down or lounge position, the maximum deviation of the SgRP 508 from the initial X position is about 12.105 mm. Accordingly, though the slideable tracks 330 are being translated relative to the base tracks 320, an occupant of the lounge seat 46 would have the sensation that he or she remains stationary in the forward/rearward direction. Therefore, (a) X position of the lounge seat 46 is configured to deviate less than 35 mm (e.g., less than 20 mm, less than 15 mm, less than 13 mm, etc.) in the X direction from the initial X position when being reconfigured between the full upright position or orientation and the lounge position or orientation and (b) the initial X position and the final X position are substantially the same (e.g., less than 5 mm different, less than 1 mm different, etc.).

As shown in FIG. 16, plotting the position of the SgRP 508 in the X direction as the lounge seat 46 is (a) transitioned between the full upright position and the full down or lounge position via the height adjust motor 110 and (b) moved along the track assembly 300 via the track motor 310 provides a curve having an arc formula that defines movement of the SgRP 508 of the lounge seat 46 in the X direction. According to an exemplary embodiment, the arc formula is $y=-0.0107x^2+0.7351x-85.835$ where y is the X co-ordinate of the SgRP 508 and x is the rotation angle of the drive links 150 pivoted through interaction of the gear 502 with the height adjust motor 110.

As shown in Table 3 below, various parameters may be used to determine the average linear speed that the track motor 310 is required to translate the slideable track 330 along the base track 320 to keep up with the repositioning of the SgRP 508 in the X direction as the lounge seat 46 is repositioned between the full upright position and the full down or lounge position.

TABLE 3

Track Linear Travel Speed

| Parameter | Symbol | Value | Unit |
|---|---|---|---|
| Rotation angle for full articulation | θ | 67.3 | deg |
| Initial X Co-ordinate of SgRP w/o track movement | X1 | −85.263 | mm |
| Final X Co-ordinate of SgRP w/o track movement | X2 | 31.628 | mm |
| Speed of Height Adjust Motor 110 | N | 10 | rpm |
| Gear reduction | Z | 7.5 | |
| Time for total rotation | t | 8.41 | s |
| Track travel required in time ‘t’ = (X2 − X1) | T | 116.89 | mm |
| Avg. track linear speed required | v | 13.89 | mm/s |

The average linear speed may be calculated using the following equation:

$$v=\frac{6NT}{\theta Z}=\frac{6N(X2-X1)}{\theta Z}$$

where N is the rotational speed of the height adjust motor 110, T is the track travel distance defined by the initial X co-ordinate (X1) and the final X co-ordinate (X2), θ is the range of rotation of the drive links 150 and/or the gear 502 to achieve full articulation of the lounge seat 46, and Z is the gear reduction provided by the gear 502. Such parameters of the lounge seat 46 result in an average linear speed of the slideable track 330 of about 13.89 mm/s.

As utilized herein, the terms “approximately,” “about,” “relatively,” “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

The term “or,” as used herein, is used in its inclusive sense (and not in its exclusive sense) so that when used to connect a list of elements, the term “or” means one, some, or all of the elements in the list. Language such as the phrases “at least one of X, Y, and Z” and “at least one of X, Y, or Z,” unless specifically stated otherwise, are understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the lounge seat 46 and components thereof (e.g., the seat frame assembly 100, the back frame assembly 200, etc.) as shown in the various exemplary embodiments is illustrative only. Additionally, any element disclosed in one embodiment may be incorporated or utilized with any other embodiment disclosed herein.

The invention claimed is:

1. A lounge seat for a vehicle, the lounge seat comprising:

a seat frame assembly having a front end and a rear end;

a back frame assembly pivotably coupled to the rear end of the seat frame assembly;

a track assembly including:

a plurality of bottom tracks configured to be fixed to the vehicle; and a plurality of upper tracks, each of the plurality of upper tracks being slidably coupled to a corresponding bottom track of the plurality of bottom tracks;

a plurality of front couplers coupling the front end of the seat frame assembly to the plurality of upper tracks;

a plurality of rear couplers coupling the rear end of the seat frame assembly to the plurality of upper tracks;

a height adjust motor configured to cause movement of the seat frame assembly;

a recline motor configured to pivot the back frame assembly relative to the seat frame assembly; and a track motor configured to translate the plurality of upper tracks along the plurality of lower tracks in an X direction;

wherein the height adjust motor, the recline motor, and the track motor are configured to reposition the lounge seat between a full upright orientation associated with a first seating reference point and a full down orientation associated with a second seating reference point; and wherein a difference between the first seating reference point and the second seating reference point in the X direction is less than 35 mm.

2. The lounge seat of claim 1, wherein the first seating reference point is located higher than the second seating reference point in a Z direction perpendicular to the X direction.

3. The lounge seat of claim 1, wherein the seat frame assembly includes a bar extending between the plurality of rear couplers, and wherein, as the height adjust motor causes movement of the seat frame assembly, the plurality of rear couplers pivot to lower the bar, thereby lowering the rear end of the seat frame assembly.

4. The lounge seat of claim 1, wherein the seat frame assembly includes a bar extending between the plurality of front couplers, and wherein, as the height adjust motor causes movement of the seat frame assembly, the plurality of front couplers pivot to raise the bar, thereby raising the front end of the seat frame assembly.

5. The lounge seat of claim 1, wherein, while the track assembly moves in the X direction as the lounge seat is repositioned between the full upright orientation and the full down orientation, the height adjust motor is configured to cause (a) the front end of the seat frame assembly to raise and (b) the rear end of the seat frame assembly to lower.

6. The lounge seat of claim 1, wherein, as the height adjust motor causes movement of the seat frame assembly, the recline motor is configured to pivot the back frame assembly relative to the seat frame assembly.

7. The lounge seat of claim 1, further comprising a gear coupled to one of the plurality of rear couplers and the height adjust motor.

8. The lounge seat of claim 1, further comprising a leg rest assembly including:

a leg rest base;

a leg rest link coupling the leg rest base to the seat frame assembly; and a leg rest motor.

9. The lounge seat of claim 8, wherein the leg rest motor is configured to pivot the leg rest base relative to the leg rest link.

10. The lounge seat of claim 9, wherein the leg rest assembly includes a leg rest extension movably coupled to the leg rest base.

11. The lounge seat of claim 10, wherein the leg rest extension is configured to translate relative to the leg rest base.

12. The lounge seat of claim 10, wherein the leg rest extension is configured to pivot relative to the leg rest base.

13. The lounge seat of claim 1, wherein the difference between the first seating reference point and the second seating reference point in the X direction is less than 20 mm.

14. The lounge seat of claim 13, wherein the difference between the first seating reference point and the second seating reference point in the X direction is less than 5 mm.

15. The lounge seat of claim 13, wherein the difference between the first seating reference point and the second seating reference point in the X direction is less than 1 mm.

16. The lounge seat of claim 1, wherein a X position of the lounge seat is configured to deviate less than 20 mm in the X direction from an initial X position as the lounge seat is repositioned between the full upright orientation and the full down orientation.

17. The lounge seat of claim 16, wherein the X position of the lounge seat is configured to deviate less than 15 mm in the X direction from the initial X position as the lounge seat is repositioned between the full upright orientation and the full down orientation.

18. The lounge seat of claim 1, wherein, in the full upright orientation, the front end of the seat frame assembly is between 0 degrees and 5 degrees above or below the rear end of the seat frame assembly, and wherein, in the full down orientation, the front end of the seat frame assembly is between 5 degrees and 35 degrees above the rear end of the seat frame assembly.

19. A lounge seat for a vehicle, the lounge seat comprising:

a seat frame assembly having a front end and a rear end;

a back frame assembly pivotably coupled to the rear end of the seat frame assembly;

a track assembly including:

a plurality of bottom tracks configured to be fixed to the vehicle; and a plurality of upper tracks, each of the plurality of upper tracks being slidably coupled to a corresponding bottom track of the plurality of bottom tracks;

a plurality of front couplers coupling the front end of the seat frame assembly to the plurality of upper tracks;

a plurality of rear couplers coupling the rear end of the seat frame assembly to the plurality of upper tracks;

a height adjust motor configured to cause movement of the seat frame assembly;

a recline motor configured to pivot the back frame assembly relative to the seat frame assembly; and a track motor configured to translate the plurality of upper tracks along the plurality of lower tracks in an X direction;

wherein, as the lounge seat is reconfigured from a full upright orientation to a full down orientation, (i) the track motor is configured to cause the seat frame assembly to move along the X direction, (ii) the height adjust motor is configured to cause the front end of the seat frame assembly to raise and cause the rear end of the seat frame assembly to lower, and (iii) the recline motor is configured to cause the back frame assembly to pivot downward;

wherein the lounge seat defines a seat reference point;

wherein, as the lounge seat is repositioned between the full upright orientation and the full down orientation, the track motor is controlled to translate the plurality of upper tracks along the plurality of lower track such that an X position of the lounge seat is configured to deviate less than 15 mm in the X direction from an initial X position of the seat reference point as the lounge seat is repositioned between the full upright orientation and the full down orientation; and wherein a difference between the initial X position of the seat reference point associated with the full upright orientation and a final X position of the seat reference point associated with the full down orientation in the X direction is less than 5 mm.

20. A lounge seat for a vehicle, the lounge seat defining a seat reference point, the lounge seat comprising:

a seat frame assembly;

a back frame assembly pivotably coupled to the seat frame assembly;

a track assembly coupled to the seat frame assembly and configured to facilitate translating the seat frame assembly in a X direction, the track assembly including:

a plurality of bottom tracks configured to be fixed to the vehicle; and a plurality of upper tracks, each of the plurality of upper tracks being slidably coupled to a corresponding bottom track of the plurality of bottom tracks; and a plurality of motors configured to cause movement of the seat frame assembly, the back frame assembly, and the track assembly to adjust the lounge seat between a full upright orientation associated with an initial X position of the seat reference point along the X direction and a full down orientation associated with a final X position of the seat reference point along the X direction, wherein the initial X position and the final X position are substantially the same.

* * * * *